(12) United States Patent
Matz

(10) Patent No.: US 7,698,720 B2
(45) Date of Patent: Apr. 13, 2010

(54) CONTENT BLOCKING

(75) Inventor: William R Matz, Atlanta, GA (US)

(73) Assignee: AT&T Intellectual Property I, L. P., Reno, NV (US)

(*) Notice: Subject to any disclaimer, the term of this patent is extended or adjusted under 35 U.S.C. 154(b) by 1643 days.

(21) Appl. No.: 10/176,909

(22) Filed: Jun. 20, 2002

(65) Prior Publication Data

US 2004/0255321 A1    Dec. 16, 2004

(51) Int. Cl.
*H04N 7/10* (2006.01)
*H04N 7/025* (2006.01)

(52) U.S. Cl. .......................... 725/34; 725/35

(58) Field of Classification Search ............... 725/34, 725/35, 45, 46, 47; 386/125
See application file for complete search history.

(56) References Cited

U.S. PATENT DOCUMENTS

| | | | |
|---|---|---|---|
| 5,038,211 A | 8/1991 | Hallenbeck | 358/142 |
| 5,559,548 A | 9/1996 | Davis et al. | 348/6 |
| 5,630,119 A | 5/1997 | Aristides et al. | 395/601 |
| 5,664,046 A * | 9/1997 | Abecassis | 386/125 |
| 5,818,438 A | 10/1998 | Howe et al. | 345/327 |
| 5,892,508 A | 4/1999 | Howe et al. | 345/29 |
| 5,917,481 A | 6/1999 | Rzeszewski et al. | 345/327 |
| 5,983,227 A | 11/1999 | Nazem et al. | 707/10 |
| 6,005,565 A * | 12/1999 | Legall et al. | 715/721 |
| 6,029,195 A * | 2/2000 | Herz | 725/116 |
| 6,057,872 A * | 5/2000 | Candelore | 725/23 |
| 6,076,094 A | 6/2000 | Cohen et al. | 707/10 |
| 6,172,674 B1 | 1/2001 | Etheredge | 345/327 |
| 6,177,931 B1 * | 1/2001 | Alexander et al. | 725/52 |
| 6,252,586 B1 | 6/2001 | Freeman et al. | 345/321 |
| 6,260,192 B1 * | 7/2001 | Rosin et al. | 725/39 |
| 6,314,577 B1 | 11/2001 | Pocock | 725/93 |
| 6,351,596 B1 * | 2/2002 | Ostrover | 386/46 |
| 6,675,161 B1 | 1/2004 | Suchter | |
| 6,704,787 B1 * | 3/2004 | Umbreit | 709/229 |
| 6,760,916 B2 * | 7/2004 | Holtz et al. | 725/34 |
| 6,973,665 B2 * | 12/2005 | Dudkiewicz et al. | 725/46 |
| 7,260,823 B2 * | 8/2007 | Schlack et al. | 725/9 |
| 2001/0001160 A1 * | 5/2001 | Shoff et al. | 725/51 |

(Continued)

OTHER PUBLICATIONS

"The Wink System,", www.wink.com, date unknown, 5 pages.

(Continued)

*Primary Examiner*—Brian T Pendleton
*Assistant Examiner*—Jonathan Lewis
(74) *Attorney, Agent, or Firm*—Scott P. Zimmerman PLLC

(57) ABSTRACT

A method for blocking content from being presented at a client device based on a user profile and content tags. Content having descriptive tags is delivered to a client device from a server device. The descriptive tags classify the content. A user profile at the client device contains tag data for identifying categories of content that the user does not want presented on the client device. The client device recognizes and evaluates the tags of received content and blocks content based on the user profile. The blocked content will not be presented to the user. The user profile may be created automatically or manually by the user. The user profile is automatically created based on usage history or demographic information. The client device has a tag dictionary that may be updated to correspond to tags utilized by content delivery systems.

23 Claims, 15 Drawing Sheets

U.S. PATENT DOCUMENTS

| | | |
|---|---|---|
| 2001/0020298 A1* | 9/2001 | Rector et al. .................. 725/50 |
| 2002/0032907 A1* | 3/2002 | Daniels ....................... 725/51 |
| 2002/0056109 A1* | 5/2002 | Tomsen ....................... 725/60 |
| 2002/0073421 A1 | 6/2002 | Levitan et al. |
| 2002/0092019 A1* | 7/2002 | Marcus ........................ 725/37 |
| 2002/0124252 A1* | 9/2002 | Schaefer et al. .............. 725/33 |
| 2002/0138836 A1* | 9/2002 | Zimmerman ................ 725/46 |
| 2002/0162108 A1* | 10/2002 | Lin-Hendel .................. 725/52 |
| 2002/0194595 A1 | 12/2002 | Miller et al. |
| 2003/0028871 A1* | 2/2003 | Wang et al. .................... 725/9 |
| 2003/0032409 A1* | 2/2003 | Hutcheson et al. .......... 455/414 |
| 2003/0061610 A1* | 3/2003 | Errico ......................... 725/46 |
| 2003/0088874 A1* | 5/2003 | Bazin et al. ................... 725/86 |
| 2003/0097657 A1* | 5/2003 | Zhou et al. .................... 725/46 |
| 2003/0101449 A1* | 5/2003 | Bentolila et al. .............. 725/10 |
| 2003/0126227 A1* | 7/2003 | Zimmerman et al. ........ 709/217 |

OTHER PUBLICATIONS

"allNet Devices:—Report: Interactive TV Soon to Become Direct Marketing Tool," www.allnetdevices.com, Feb. 21, 2000, 14 pages.

Liberate Technologies, www.solutions.liberate.com, date unknown, 7 pages.

* cited by examiner

CONTENT BLOCKING

FIELD OF THE INVENTION

The present invention generally relates to networked media delivery systems. More particularly, the present invention relates to a method and system for blocking selected content from presentation to a user.

BACKGROUND OF THE INVENTION

Computer and television networks have become the predominant means through which individuals receive media content, such as entertainment and information. As technology has improved, media content providers, using computers and television, have been able to provide more and more media content to larger and larger audiences. Broadcast, cable, and satellite television providers transmit television signals containing vast amounts of content, such as movies, news, special interest shows, audio, advertising, and home shopping programs, among others. It is not uncommon for cable and satellite television viewers to have over one hundred channels to choose from. Internet service providers similarly transmit vast amounts of content of various types to computers via the Internet. Computer users have thousands of Internet sites to choose from. When a computer user accesses an Internet site, the user is often provided a large amount of content, such as advertisements, promotions, links, and others.

One problem with current approaches toward media content distribution is that there is too much content provided to any given user. In an attempt to maximize viewership and/or profits, content providers typically transmit content to as many viewers as possible, who are able to receive the content (e.g., via television signals, internet transmissions, etc.). From the user's perspective, the massive amount of transmitted content results in an "information overload" effect. Viewers are inundated with such a vast amount of content that effectively choosing what they most want to view becomes difficult. Viewers simply do not have time to view all of the content, and therefore attempt to be selective. Moreover, for any given viewer, the content that streams into the viewer's home includes a large amount of content that the viewer will not want to watch.

Most computer and television users know a priori (i.e., before receiving it) of certain categories of content that they will not want to view based only on the type of content. For example, many users, particularly parents, do not want pornographic content to be an option for selection on their television or computer. As another example, many users may not want to view sports, while other viewers may know a priori that they do not want to view any sports, except bowling. Many viewers may know before hand that they will never choose to watch cooking shows. Thus, television and computer users frequently know ahead of time of certain categories of media content that they will not want to view. Unfortunately, notwithstanding users' a priori knowledge, content providers typically broadcast the same content to everyone. For any given user, much of that content is unwanted.

In the area of broadcast television, a user typically cannot easily block unwanted content. When a user receives a television signal containing a wide variety of content, there will typically be unwanted content mixed with content the user does want. The user typically must become aware of the unwanted content, and learn enough about the unwanted content in order to make the decision to block the content by, for example, changing the channel. Since unwanted content is often mixed with wanted content, a user typically cannot simply reject all content from a given television station without also rejecting desired content. For example, although a user may have the option to deselect a cable channel through the user's cable television provider, if the user does so, he/she may be unknowingly giving up wanted content. Thus, simply deselecting a channel does not adequately solve the problem of blocking content.

One possible solution, in the area of television, is a programming guide (PG). A PG typically presents all available television options in a scrolling fashion across the TV screen. PGs are difficult to read and confusing because they simultaneously present too much information and too little information for a discriminating viewer. PGs present too much information because they provide descriptions for every item of available content, including unwanted content. The user typically must read through all the descriptions to determine his/her preferred content. So many channels are typically presented on a PG that a viewer could easily miss a desired show while reading all the options, many of which are unwanted. PGs present too little information for each available content item because the descriptions are necessarily short due to limited space and time in the guide. PG descriptions are frequently not descriptive enough to allow a discriminating viewer to effectively determine whether any particular content item should be blocked.

On the Internet, content providers attempt to direct content to users based on past selections that the user has made. Based on user selections, the content provider transmits a unique piece of data to users' computers, so that the content provider can later recognize when a user revisits a site. This unique piece of data is often referred to as a 'cookie.' When the content provider recognizes a cookie that was previously stored on the user's computer, the content provider may direct content to the user based on the user's past selections. Although this approach may tend to block content that the user does not want, many users find it intrusive and a violation of their privacy because the cookie is stored on the user's computer without the user's knowledge of it, and the cookie is later transmitted to the content provider, again without the user's knowledge.

Unfortunately, traditional methods and systems do not effectively block content from being presented to the user that is known a priori to be unwanted. Prior approaches toward blocking unwanted content has either put the burden on the user to block content by reading confusing guides and sorting through hundreds of options, which wastes valuable time, or violates users' privacy by downloading information unknown to the user and/or accessing the user's client device without the user knowledge. Thus, a need exists for content to be automatically blocked so that users are not burdened with wasting user time sorting through vast amounts of content, which is known a priori that they do not want to view.

It is with respect to these and other considerations that the present invention has been developed.

SUMMARY OF THE INVENTION

The present invention relates to a system and method of blocking content, such as advertisements and other content items, which may be less preferred or unwanted by a user. The system and method involve a server device that tags content based on content type and then sends the tagged content to a client device. The client device receives the tagged content and uses the tags to block content locally based on a predetermined user profile. The user profile contains tag information representing the types of content that the user prefers less or does not want to be presented. Substitute content is identified when content is blocked.

In one embodiment, the invention relates to a method of identifying blocked content based on a user profile and content tags and identifying substitute content to present in place of the blocked content. Tagged content is delivered to the user's client device. Using category content tags, a client device determines which, if any, content is to be blocked. In one embodiment, the client identifies one or more content items to substitute for the blocked content based on preference data.

Embodiments include a method of modifying a user profile in a client device by presenting tagged content, monitoring viewing statistics associated with the tagged content, and modifying the user profile based on the viewing statistics. Modifying the user profile comprises may include a step of enabling a user to select one or more tag categories for insertion into the user profile. The method may further include steps of presenting a viewing history having a category and the viewing statistics, and presenting tag categories that may be selected for insertion into the user profile. The category in the viewing history may be selectable for insertion into the user profile.

Another embodiment includes a client device for blocking content prior to presentation to a user having a user profile with profile tags associated with unwanted content. The user profile may be created based on a viewing history. The client device includes a receive module for receiving tagged content, an analysis module for blocking tagged content based on the user profile, and a user input/output module for presenting received content. The analysis module may further include a profile generator that updates the user profile based on the content selection from the user. The analysis module may further include a blocking module operable to block the tagged content from presentation to the user input/output module.

Yet another embodiment includes a user interface to facilitate editing a user profile based on a viewing history. The user interface includes a viewing history window pane having content categories of viewed content and viewing time values representing viewing times associated with viewed content categories. A categories window pane includes content category names and subcategory names, from which a user may choose to build a user profile. A user profile window pane provides text fields displaying category names and subcategory names that are in the user profile. Categories and subcategories may be added and/or deleted from the user profile window pane for insertion and deletion from the user profile. The categories window pane may include a drop down menu presenting selectable subcategories associated with a higher-level category.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

DETAILED DESCRIPTION

Figure 1:
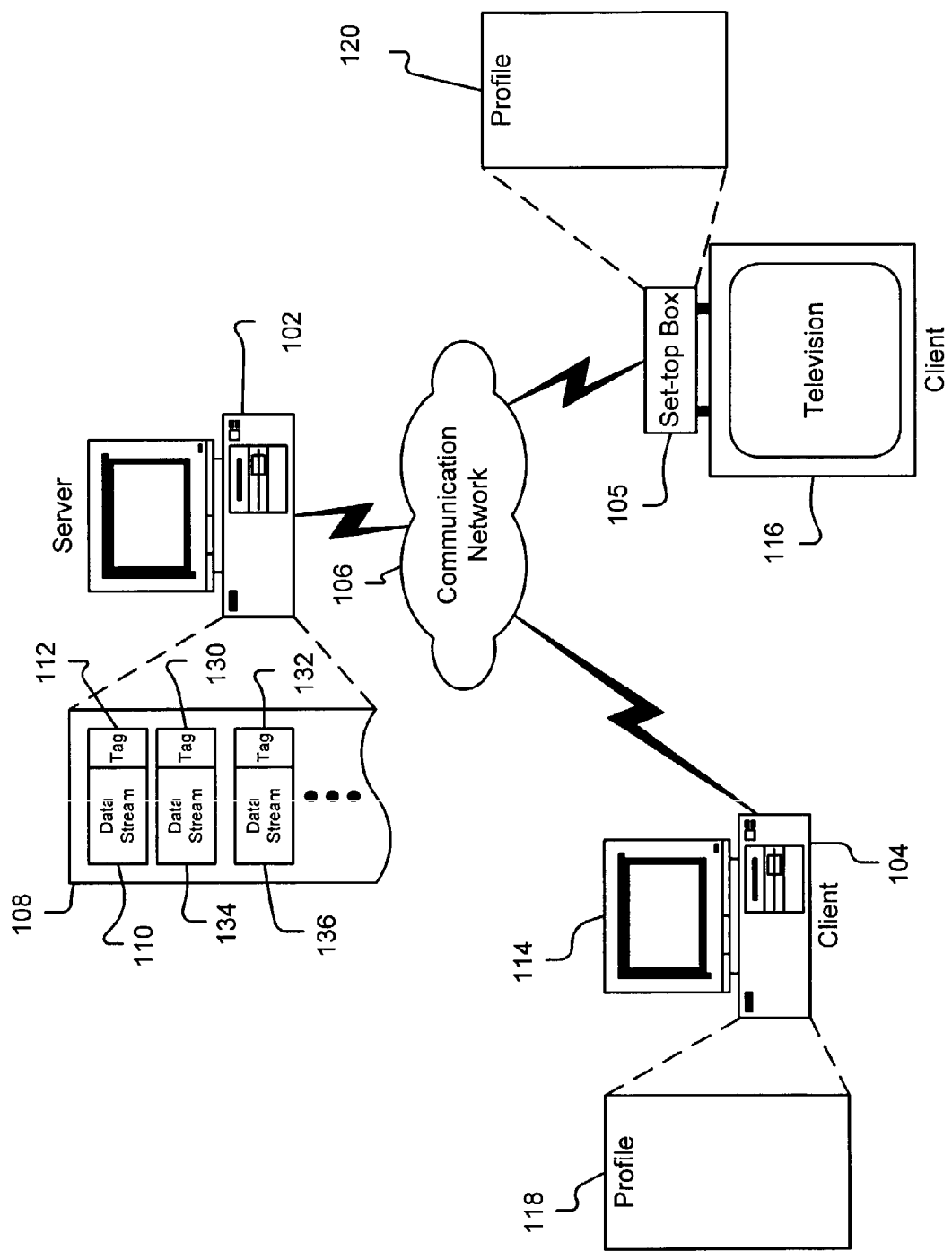
FIG. 1 is an exemplary operating environment implementing an embodiment of the present invention.

FIG. 1 illustrates an exemplary operating environment 100 employing an embodiment of the present invention. A server device 102 communicates with one or more client devices, such as client device 104 and/or client device 105, via a communication network 106. Server device 102 transmits media content, such as, but not limited to, video, audio, text, or executable programs, over the communication network 106 to be used by the client devices 104 and/or 105. Each of the client devices 104 and/or 105 has an output device, such as a computer monitor 114, or a television screen 116, for presenting media content to the user.

The server device 102 has memory 108 that stores media content in the form of data streams 110, 134, and 136. The server device 102 also stores an associated tag, such as tags 112, 130, and 132, with each data stream 110, 134, and 136, respectively. Each of the tags 112, 130, and 132 may be unique from the others and may further be associated with user classifications such as user demographics or usage patterns based on generalized demographic information. The tagged data streams 110, 134, and 136 may be transmitted to the client devices 104 and 105. The tags are used by client devices 104 and 105 to block content; i.e., prevent the content from being presented.

In an embodiment, one or more data streams are transmitted with the tags to the client devices 104 and 105. The client devices 104 and 105 determine which, if any, of the received data streams are inappropriate for presentation to the user of the client device 104, 105 by analyzing the tag information. The client devices 104 and 105 have access to a user profile, such as user profile 118 and 120, respectively, that is further used to analyze the tag information to determine which content should be blocked.

In one embodiment, the client device 104 is a computer system, and the server device 102 is a server computer, such as a web server or e-commerce application server. In this embodiment, the communication network 106 may be the Internet communicating data such as Extensible Markup Language (XML) or Hypertext Markup Language (HTML) data to the client device 104. As noted above, the data communicated over the network 106 is tagged. The user profile 118 comprises tags corresponding to user preferences for content received from the Internet. Upon receipt of data stream 110 and its associated tag 112, the desktop computer client 104 evaluates the tag 112 and the user profile 118 to determine if the data stream 110 is to be blocked. In one embodiment, if the tag 112 is listed in the user profile 118, the associated data stream 110 is blocked from presentation to the user of the desktop computer client device 104.

In another embodiment, the client device 105 is a set-top-box (STB). In this embodiment, the communication network 106 may be a satellite television broadcast network and the server 102 may be a head-end of a cable service provider. The cable service provider generally broadcasts programming, advertising, "walled garden" merchandising offers, and other media content. As mentioned above, the media content is broadcasted in the form of data streams 110, 134, and 136 and associated tags 112, 130, and 132, respectively, to the STB 105. The STB 105 evaluates the tags 112, 130, and 132 and the STB user profile 120 to determine if any of the data streams 110, 134, or 136 should be blocked from presentation to the user of the STB 105. The STB 105 does not present to the user the data stream(s) that are inappropriate based on the user profile 120.

While FIG. 1 depicts two types of client devices, a personal desktop computer 104 and a television set top box (STB) 105, it is to be understood that the client devices 104 and 105 may be any device operable to communicate via the communications network 106, and operable to receive a data stream, such as data stream 110 having a tag such as 112. By way of example, and not limitation, the client device 104 may be a personal digital assistant (PDA), a laptop computer, or a cellular telephone, among others. By way of further example, and not limitation, the communication network 106 may be wireless network, an Ethernet, a local area network (LAN), a wide area network (WAN), or a television broadcast network, among others.

Figure 2:
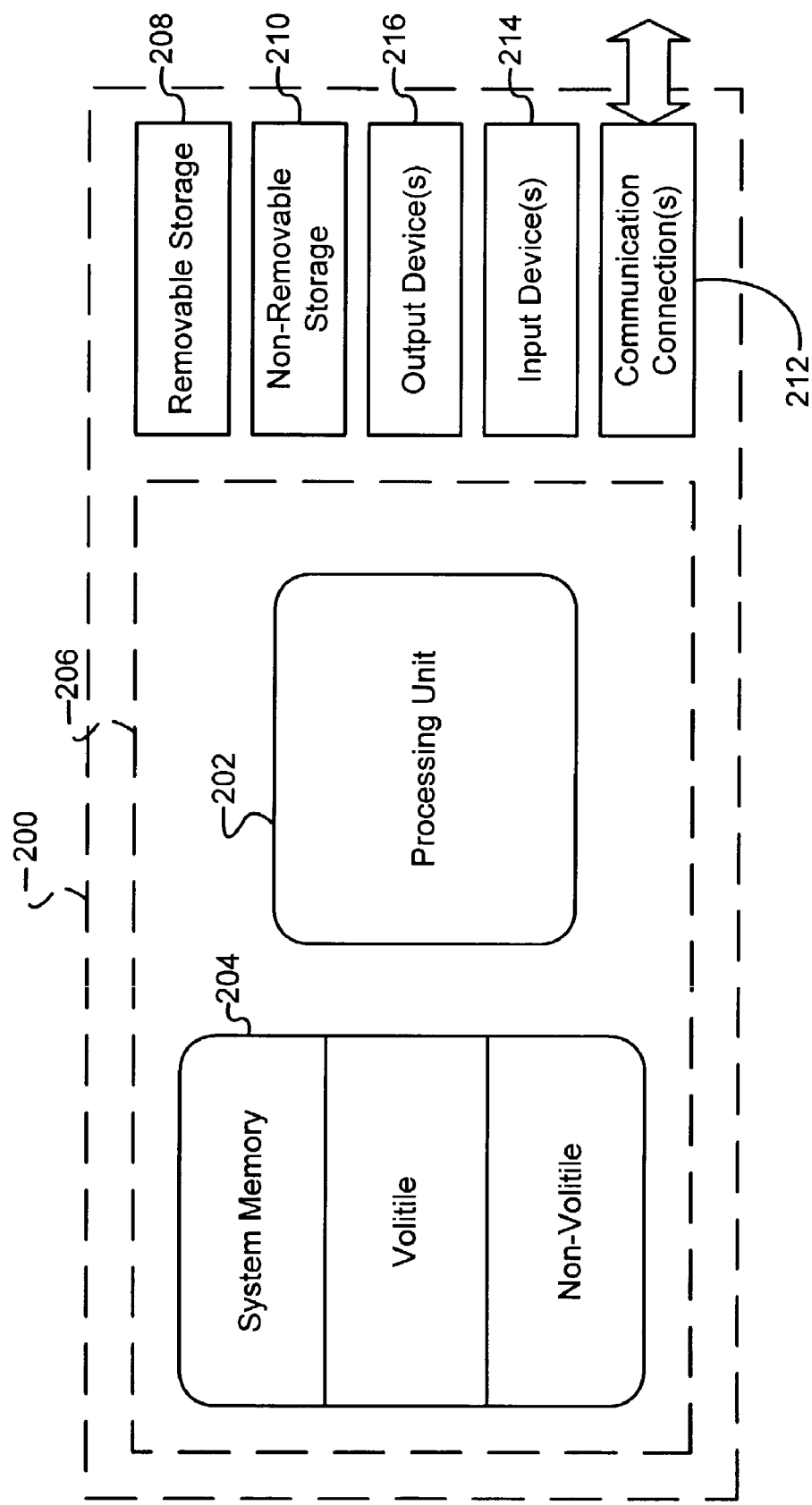
FIG. 2 is a computer system suitable for implementing an embodiment of the present invention.

FIG. 2 illustrates an exemplary system for implementing the invention with a computing device 200. In its most basic configuration, the computing device 200 typically includes at least one processing unit 202 and memory 204. Depending on the exact configuration and type of computing device, the memory 204 may be volatile (such as RAM), non-volatile (such as ROM, flash memory, etc.) or some combination of the two. This most basic configuration is illustrated in FIG. 2 by dashed line 206.

Additionally, the device 200 may also have additional features and functionality. For example, the device 200 may also include additional storage (removable and/or non-removable) including, but not limited to, magnetic or optical disks or tape. Such additional storage is illustrated in FIG. 2 by removable storage 208 and non-removable storage 210.

Computer storage media includes volatile and nonvolatile, removable and non-removable media implemented in any method or technology for storage of information such as computer readable instructions, data structures, program modules or other data.

The memory 204, removable storage 208 and non-removable storage 210 are all examples of computer storage media. Computer storage media includes, but is not limited to, Random Access Memory (RAM), Read Only Memory (ROM), Electrically Erasable Programmable ROM (EEPROM), flash memory or other memory technology, CD-ROM, digital versatile disks (DVD) or other optical storage, magnetic cassettes, magnetic tape magnetic disk storage or other magnetic storage devices, or any other medium which can be used to store the desired information and which can be accessed by device 200. Any such computer storage media may be part of the device 200.

The device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

The device 200 may also have input device(s) 214 such as keyboard, mouse, pen, voice input device, touch input device, remote control unit, etc. Output device(s) 216 such as a display, speakers, printer, etc. may also be included. All these devices are well known in the art and need not be discussed at length here.

In one embodiment, the computing device 200 is the set-top box (STB) 105. In this particular embodiment, the STB 105 provides a control interface through which a subscriber makes viewing selections by, e.g., using a remote control unit, a keyboard, or a control panel. In providing this interface, the STB 105 performs the following functions: (1) routes traditional broadcast signals to the connected viewing device; (2) converts media content to a selected video format (e.g., NTSC or PAL) and presents the content to the subscriber; (3) for interactive systems, exchanges messages (including display data) with the server device 102 over distribution network 106; (4) receives messages from a subscriber input device, such as a remote control unit; (5) translates video signals from a network-native format into a format that can be used by the viewing device; (6) inserts alphanumeric or graphical information (e.g., program guides, menus, etc.) into the video stream to overlay that information on the video image; and (7) provides graphic or audio feedback to the subscriber. Examples of commercially available set-top boxes 105 that satisfy these functions include an SA Explorer 2000 set-top box by Scientific Atlanta, a DCT-5000 set-top box by Motorola/General Instruments, and a Z12C set-top box by Zenith.

Figure 3:
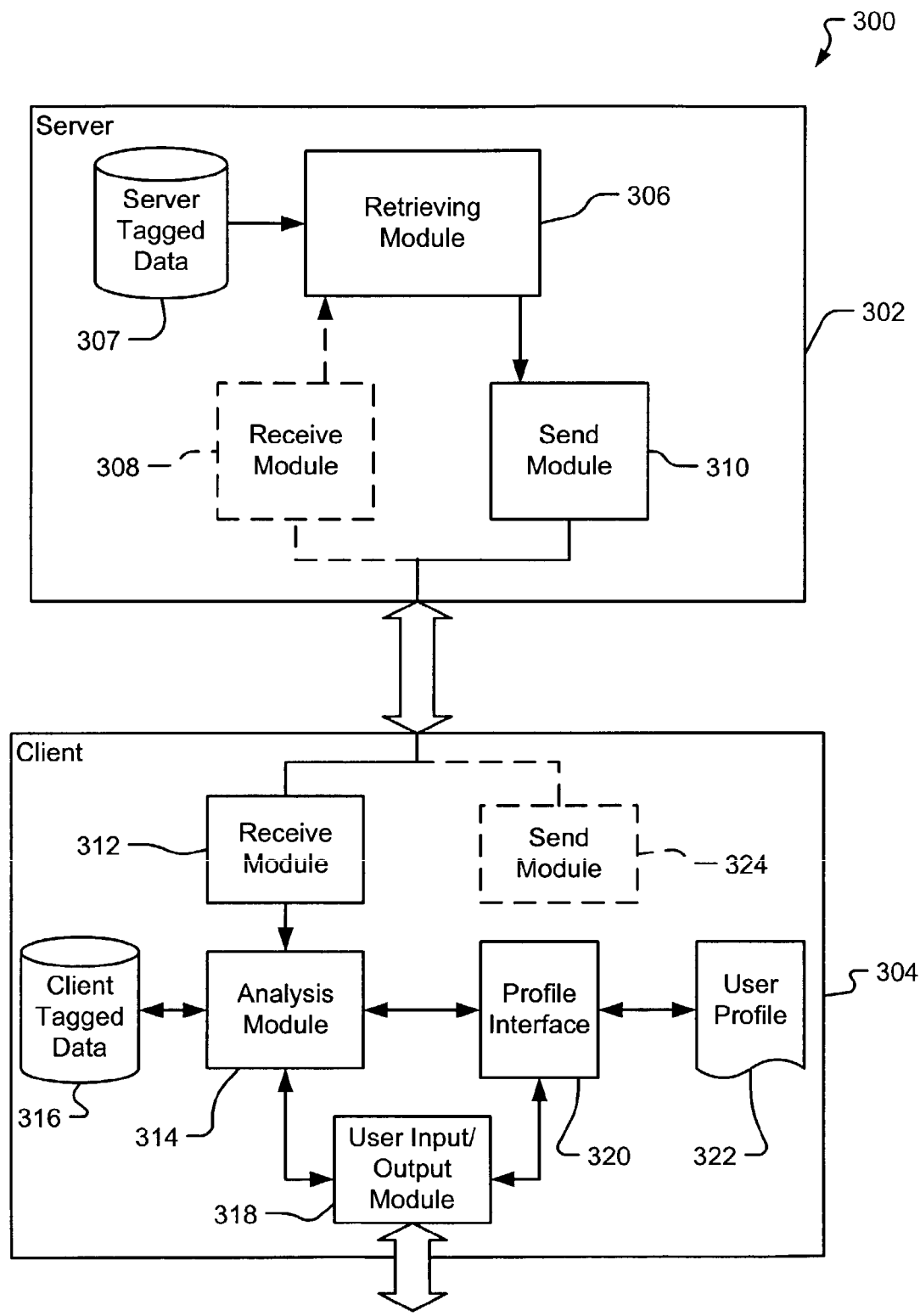
FIG. 3 is module diagram illustrating exemplary software, hardware, or firmware modules running in the computer system of FIG. 2.

FIG. 3 is a functional block diagram of a client-server system 300 employing an embodiment of the present invention. As discussed in more detail below, the client-server system 300 provides tagged content to users of the system 300. The content may include advertising and non-advertising content, including, but not limited to, news, games, programming, books, and sports. A server 302 transmits media content to a client 304, which represents any client system, such as systems 104 and 105 (FIG. 1). Media content sent by the server 302 is in a tagged data stream format, as noted above. Data streams at the server 302 are tagged with tags corresponding to classifications of media content. Classifications include, but are not limited to, content type or format (e.g., advertisement, movie, etc.), subject matter of the content, title, and rating (e.g., G, R, PG-13, etc.). The tags allow the client device 304 to block content that is determined to be objectionable to the user, i.e., predetermined content.

In one embodiment, the server device 302 includes a retrieving module 306, a receive module 308, and a send module 310. The receive module 308 receives requests from the client. An example of a request from the client 304 is a Hypertext Transport Protocol (HTTP) Request for an Internet page on the server 302. In the response to the request, the server 302 uses a send module 310 to send multiple, tagged data streams of content to the client 304. The available tagged content is retrieved from a tagged data memory 307 by the retrieving module 306. The tagged data memory 307 contains tagged content items. As discussed above, tagged content items are generally data streams with data tags that classify the content according to predetermined criteria. In one embodiment, the server device 302 may obtain the tagged content items from content providers (e.g., advertisers), which tag the content based on the predetermined criteria. In another embodiment, the server may tag the content items itself. The send module 310 receives the tagged content items from the retrieving module 306 and transmits the tagged content items to the client 304.

In another embodiment, the server device 302 does not have a receive module 308. For instance, in some cases, the server device 302 primarily broadcasts content onto a broadcast network (e.g., satellite TV, High Definition Television (HDTV)). In this particular embodiment, the client 304 may represent an STB, such as STB 105 (FIG. 1) and the client 304 may receive the broadcasted content from the broadcast network, but may not need to send information back to the server device 302. In this embodiment, the client 304 simply receives tagged data streams of content sent by the server device 302 and blocks selected content locally. Thus, as is discussed below, the send module of the client device 302 may not be necessary in some media content distribution networks, such as a broadcast TV/STB implementation.

The client device 304 includes a receive module 312, which receives the transmitted tagged data streams from the server device 302. The receive module 312 performs all tasks associated with receiving data from the server 302, including, for example, detecting incoming data, and synchronizing to receive the data. The receive module 312 may also decode, digitize, format, and/or buffer incoming tagged data as may be necessary in a particular implementation. The receive module 312 sends the tagged data to an analysis module 314, which analyzes the received tagged data. The analysis module 314 determines which, if any, of the tagged data is to be blocked from presentation to the user. The process of determining whether tagged data should be blocked is discussed in more detail below. If the analysis module 314 determines that an item of tagged data is to be blocked, the analysis module 314 does not present that item to the user.

In one embodiment, the analysis module 314 stores the received tagged data in a tagged data memory 316. The analysis module 314 may store the tagged data in any arrangement in the tagged data memory 316 that is suitable for the particular implementation. For example, the analysis module 314 may group certain types of content together. The analysis module 314 may group advertising content together, games content together, movies content together, etc. The tagged data is generally organized in the tagged data memory 316 in a way to facilitate quick and efficient access, but such organization is not necessary. In an alternative embodiment, the analysis module 314 passes selected content straight through, without storage, to a user input/output module 318.

The user input/output module 318 performs tasks associated with conducting media content to an output device such as a display monitor, speakers, or a printer (e.g., the output devices 216 in FIG. 2). The user input/output module 318 also performs tasks associated with receiving input from a user, such as mouse clicks, keyboard entry, or remote control entry (e.g. via input devices 214 in FIG. 2). While a user inputs data, the user input/output module 318 detects the user input and may transmit the user input to a profile interface 320 for analysis. In one embodiment, the analysis module 320 evaluates user input to detect patterns in the user input. Based on the detected usage patterns, the profile interface 320 updates a user profile 322.

In one embodiment, the analysis module 314 detects events that trigger presentation content. Events that trigger presentation content are generally referred to as insertion events. The analysis module 314 may receive these events from the server 302 through the receive module 312 or the analysis module 314 may receive these events from the user input/output module 318. With respect to events from the receive module 312, an exemplary event is an advertisement insertion event, which indicates that an ad should be presented to the user. In this case, the advertisement insertion event may be a cue tone contained within the network TV broadcast, which may be transmitted along with other media content from the server 302. In general, insertion events that are received from the server 302 may be referred to as external predetermined events because they arise externally from the client 304 and typically indicate a predetermined time for presentation.

Another type of insertion event that the analysis module 314 may detect is an internal event that arises on the client side. One example of an internal insertion event is a user initiated menu selection from a STB navigator, such as the user requesting a list of available television shows, a list of games that are available to play online or books that are available via an online bookstore, among others. Each list of respective items offered may be tagged by the server system and screened by the client device so as to block content items that are not desired. Furthermore, the initial navigator menu presented on the display may be customized manually or automatically at the client device based upon prior user behavior and user profile so as to order the list of available activities or actions (e.g., preferences for television program, games, shopping, news, mail, etc.), thereby presenting the user with a list best matching their probable activities. Additionally, such prior user behavior may be recognized by the client device, whereby content may be exhibited in a predetermined sequence (e.g., preferred content type displayed first upon user initiation of the device).

As a specific example, when a user turns on the user's television set and STB, the user may be immediately presented with content, advertising, programming, etc. which is in accordance with user profile 322. The user may then select a list of options of a certain type of media content using a user input device, such as a remote control, for example. The user may choose, for example, a list of games to be shown, the list providing many user choices of games. In this example, the analysis module 314 receives a selection signal from the user I/O module 318 and recognizes the user's selection of a list of games as an insertion event. A menu or list of games is then presented so the user is able select the game to be played. When the user selects one of the games in the list, the analysis module 314 will receive another insertion event to transmit the selected game to the input/output module 318. The analysis module 314, upon receiving an insertion event, accesses the client tagged data 316 to identify appropriate media content that should be displayed to the user by way of the user profile 322.

Referring again to FIG. 3, the receive module 312 transmits tagged data to the analysis module 314, which blocks unwanted tagged data based on tag information stored in the user profile 322. The analysis module 314 determines which, if any, tagged data from the receive module 312 is identified in the user profile 322. In an embodiment, tagged data that is identified in the user profile 322 is not transmitted to the user input/output module 318. In such case, only content that is not listed in the user profile 322 may be presented to the user. Advantageously, unwanted content as identified by tags in the user profile 322 are not presented to the user. In an alternative embodiment, only tagged data that has corresponding tag information in the profile is presented to the user. In this alternative case, the user is presented only predetermined content with matching tag information.

In one embodiment, the user profile 322 may be manually entered by the user. In another embodiment, the user profile may be automatically generated and/or updated based on analysis of the user's viewing history. In both embodiments the user profile is maintained privately; i.e., the user profile 322 is accessible to the client device 304, but not to external entities, such as the server device 302. Thus, unlike other systems, a user can block undesirable media content without giving up privacy.

In one embodiment, the client device 304 has a send module 324 for sending data, such as requests, to the server device 302. An example of this embodiment is a client computer 304 communicating to a server computer 302 over the Internet, wherein the client computer sends Hypertext Transport Protocol (HTTP) requests to the server computer to browse web pages. The transmission of requests to the server provides the server with the opportunity to send tagged data to the client system. This embodiment may be useful to provide for automatically requesting alternative content when received content is blocked.

In another embodiment, the client device 304 need not have a send module 324. As discussed above, an example of this embodiment is a STB 105 receiving content from a broadcast TV network. In this embodiment, the STB 105 does not send requests for data. Rather, the server device 302 (e.g., head-end of a cable service provider) is constantly broadcasting content on a number of channels that the STB 105 can switch to. Another example of a client device 304 receiving broadcast TV signal(s) is a TV-equipped computer receiving television signals, such as High Definition Television (HDTV) signals.

With specific reference to an embodiment employing the STB 105, the STB 105 employs modules such as those depicted in FIG. 3 to complete many intelligent functions, including the collecting, storing, exchanging, blocking, and displaying of data. To satisfy these functions, the STB 105 has a navigator, an operating system, and a memory buffer. The operating system is a computer program that, after being initially loaded into the STB 105 by a bootstrap program, manages the other programs, or applications, running on the STB 105. The navigator is a software application running on top of the operating system. The navigator is provided by the user I/O module 318 and generates menu screens and accepts viewer menu selections such as movie orders, preview orders, or requests to enter an interactive "walled-garden" environment that may supply news, offer products, etc. Based on these selections, the navigator directs the analysis module 314 to deliver the selected program, e.g., the analysis module 314 plays the selected movie. In addition, the navigator records viewer selections or event data in memory, such as memory 204. As is discussed below, the recorded viewer selections or event data may be analyzed by the analysis module 314 to detect usage patterns.

Figure 4:
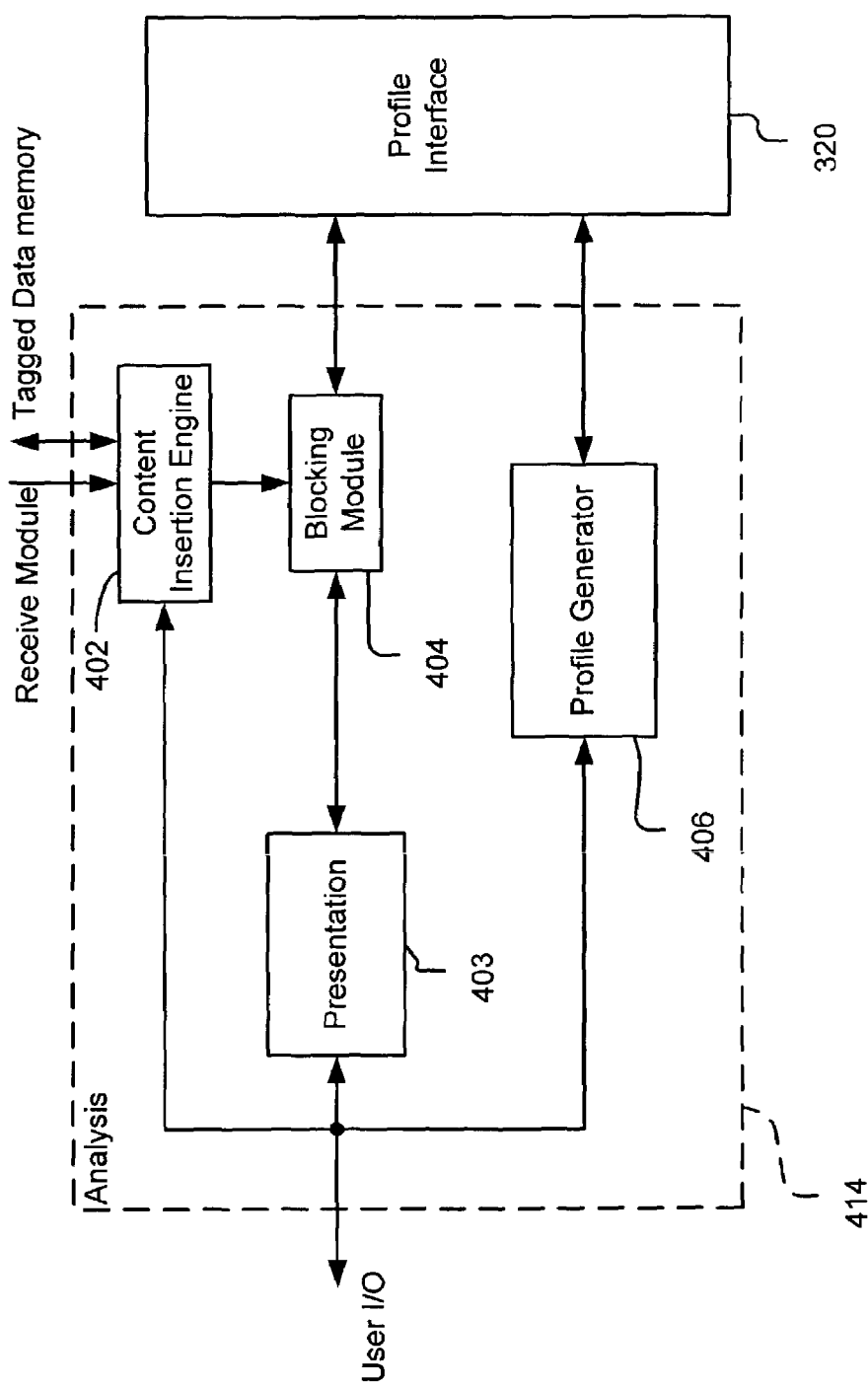
FIG. 4 illustrates an exemplary embodiment of an analysis module interacting with a user profile interface shown in FIG. 3.

With regard to the analysis module 314, an exemplary embodiment of an analysis module 414 is illustrated in FIG. 4. The analysis module 414 includes a content insertion engine 402, a blocking module 404, a presentation module 403, and a profile generator 406. The content insertion engine 402 receives data from the tagged data memory 316 and the receive module 312, and detects insertion events based on the received data. When the content insertion engine 402 receives content from the receive module 312 or the tagged data memory 316, the content insertion engine 402 may simply pass the received content on to the blocking module 404, which will evaluate the content and pass it to the presentation module 403, if appropriate. The content insertion engine 402 passes received data on to the blocking module 404 when, for example, the user is viewing a movie. The movie may be interrupted when the content insertion engine 402 receives an insertion event.

Figure 6:
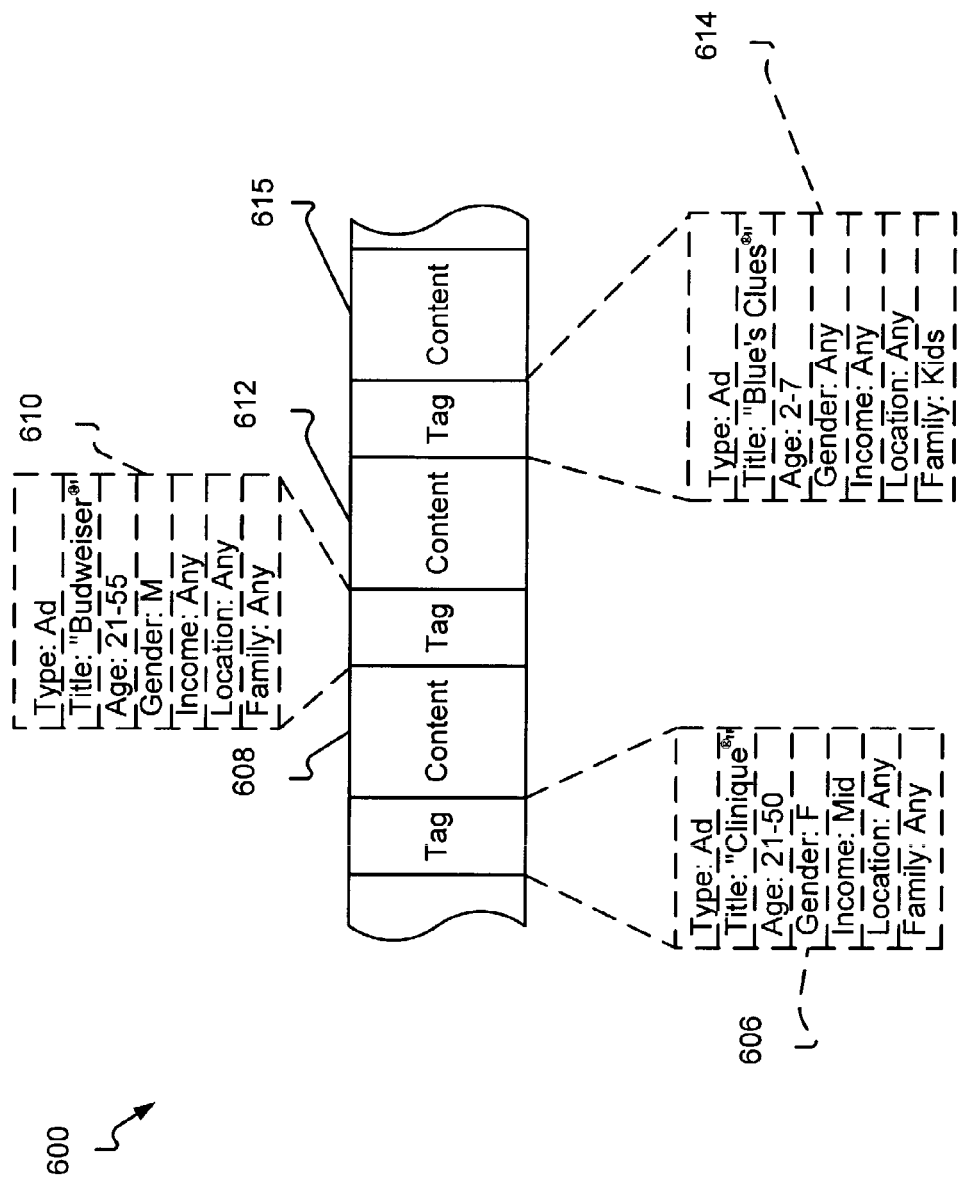
FIG. 6 illustrates another exemplary portion of tagged advertisement content that may be used in an embodiment of the present invention.

If an insertion event occurs, the content insertion engine 402 inserts tagged content from the tagged data memory 316 or from the receive module 312 into a stream of content items being sent to the blocking module 404. By way of example, a network cue-tone for video advertising is one type of insertion event that the content insertion engine 402 may detect. A network cue-tone may cause the content insertion engine 402 to insert an advertisement in the midst of content being sent to the blocking module 404. Another type of insertion event that may occur is receipt of a tag corresponding to a particular type of content, such as an advertisement. Examples of advertisement content with corresponding tags are illustrated in FIG. 6 and discussed in detail below. If an insertion event does occur, the content insertion engine 402 transmits an insert command and associated tagged content to the blocking module 404 to indicate that the media content is to be inserted (i.e., presented to the user).

In response to receiving the insert command, the blocking module 404 analyzes tag(s) received from the content insertion engine 402 and tags from the profile interface 320. The user profile interface 320 accesses data in the user profile 322. More specifically, the user profile interface 320 reads and writes tag data from and to the user profile 322. In operation, the user profile interface 320 may format or encode the tag data that is written to the user profile 322. When reading the encoded data out of the user profile 322, the profile interface 320 formats and/or decodes the data for transmission to the analysis module 414.

In one embodiment, the blocking module 404 is operable to partially and/or completely block content items. Partial blocking occurs, for example, when a movie is being presented to the user, and the blocking module 404 identifies a portion of the movie that is in a category identified in the user profile 322. For example, if "nudity", is identified in the user profile 322 as a subcategory of content that is unwanted, any portions of a movie having nudity will be selectively blocked by the blocking module 404. Other possible subcategories of content that may be blocked are violence and language, among others. In one embodiment, the blocking module is operable to selectively block the video and/or audio portions of the content.

Complete blocking occurs, for example, when a movie tag is transmitted to the blocking module 404 that has a rating (e.g., rated X) that is identified in the user profile 322 as inappropriate. In this example, any movie with a rating of "X" will be completely blocked from presentation. Categories and subcategories of content are discussed in more detail below.

In one embodiment of the analysis module 414, the blocking module 404 determines whether content in the tagged data memory 316 should be blocked from presentation to the user based upon tags in the user profile 322. As is discussed below in more detail, the tags in the tagged data memory 316 may be compared to the tags in the user profile 322. If none of the tag data 322 matches a tag, the blocking module 404 transmits the tag and content to the presentation module 403 for output to the user I/O module 318. In this embodiment, tags that match any tag data in user profile 322 are not transmitted to the presentation module 403.

The profile generator 406 receives data from the user I/O module 318 and updates the profile 322, via the profile interface 320, according to inputs from the user. In one embodiment, the profile generator 406 dynamically updates the user profile 322 based on user selections, so that when the blocking module 404 accesses the user profile 322, the blocking module 404 will analyze the received tags and content based on the most recent user preferences indicated by the profile 322. Alternatively, profiles may be static, and/or predetermined. An example of a predetermined user profile 322 is a user profile that may be obtained from an Internet site, which may provide a set of pregenerated (i.e., created in advance) user profiles from which users may select and download. The profile generator 406 preferably organizes tag data in the user profile 322 for fast and efficient access.

The user profile 322 is preferably stored in memory accessible by one or more microprocessors of the client device 304. The memory that stores the user profile 322 can be any memory medium known in the art, including, but not limited to, Personal Computer Memory Card International Association (PCMCIA) memory, Random Access Memory (RAM), Read Only Memory (ROM), Electrically Erasable Programmable ROM (EEPROM), or hard disc drive memory. It should be understood that the user profile 322 need not be stored contiguously in memory and may be separated in a memory medium accessible through a file system that maps memory locations to data. In practice, one or more of the modules shown in FIGS. 3-4 may be integrated on a single integrated circuit in any combination. Alternatively, they may be separately implemented in software or hardware.

The user profile 322 includes tag data associated with categories of content that the user does not want to be presented. In one embodiment, the user may create the user profile 322 by selecting tags from a set of predetermined tags. The set of predetermined tags may be standard tags that are used by the media industry to describe categories of content. The tags are appended to media content prior to transmission to the client device 304. To illustrate how the tags may be interpreted or used by the client device 304, tags are described in detail below.

Figure 5:
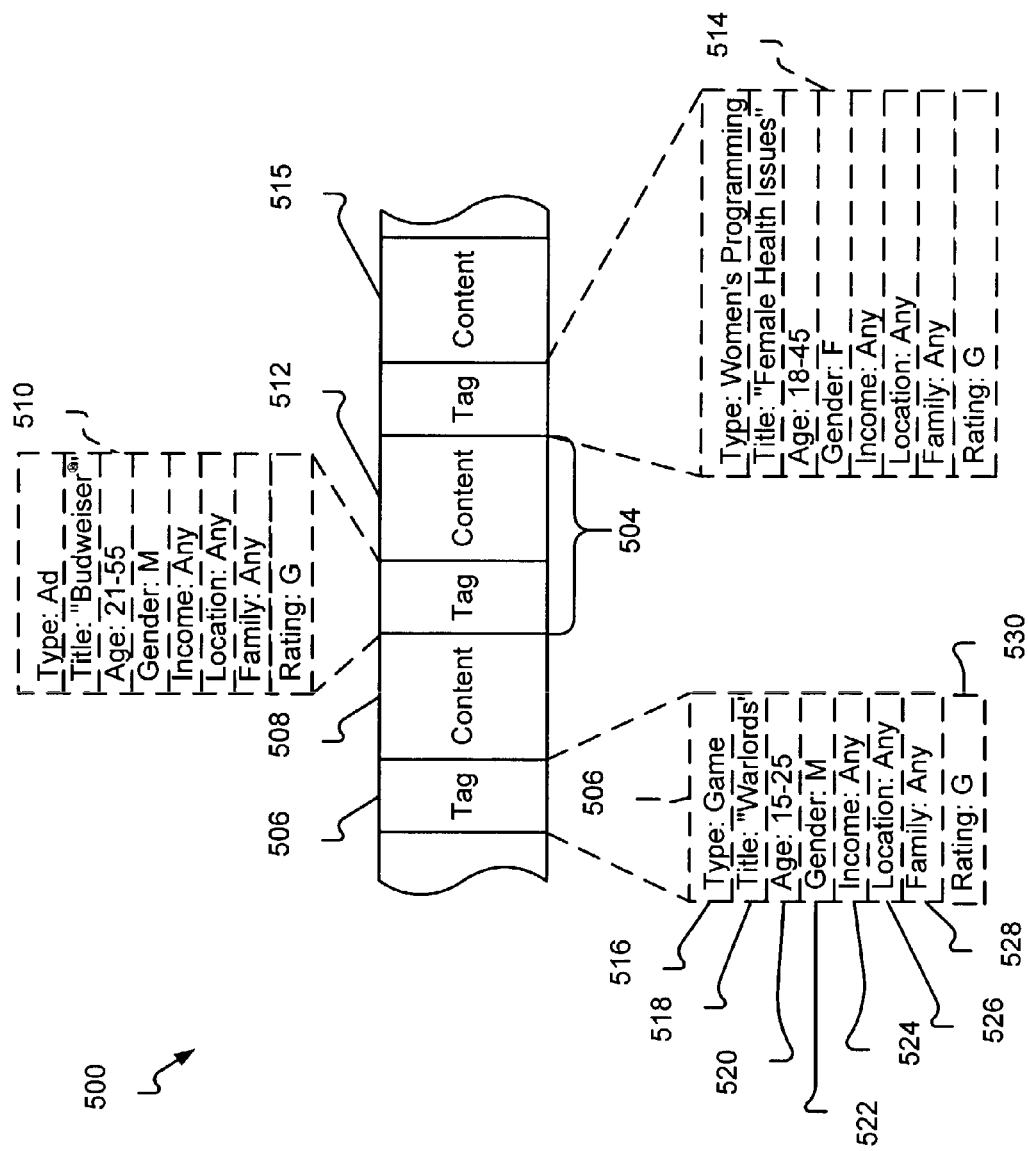
FIG. 5 illustrates an exemplary portion of tagged content that may be used in an embodiment of the present invention.

A portion of tagged content 500 that may be transmitted to a client device 304 is illustrated in FIG. 5. The portion of tagged content 500 includes tag/content pairs such as pair 504 including a tag. The tag/content pair 504 contains tag 510, and its associated content 512. As discussed above, the content may be any type of content, including, but not limited to, advertisements, movies, news programs. By way of further example, and not limitation, content items may contain descriptions (e.g., title, author, price, theme, etc.) of content such as books, movies, games, etc. Each tag is made up of fields. The fields are each descriptive of a content category or subcategory (described below). In one embodiment, the tags 506, 510, and 514 have a type field 516, a title field 518, an age field 520, a gender field 522, an income field 524, a location field 526, a family field 528, and a rating field 530. As can be seen, the fields, therefore, may describe the associated content in various terms, such as what the content is (e.g., type field 516, or title field 518, etc.), or what type of viewer the content may be appropriate for (e.g., age field 520, gender field 522 rating field 530, etc.).

For example, the tag 510 indicates that the content 512 associated with the tag 510 is an advertisement about Budweiser® beer. The tag 510 further indicates that the content 512 may be most appropriate for males from the ages 21-55. Additionally, the tag 510 indicates that the income level, location, and family characteristics (e.g., single, married, kids, etc.) of the viewer are not relevant with regard to the type of content. The tags 506, 510, and 514, are appended to the content 508, 512, and 515, respectively by the server 302 or a media content provider. The client 304 uses the tags to determine whether the content 508, 512, and 515 is appropriate for the user at the client device 304. The client 304 and server 302 utilize a common tag format.

The tag data in each of the fields may be in any format suitable for the particular implementation and the category. For example, in one embodiment, the age field 520 includes two binary encoded values, representing a minimum age and a maximum age, to specify an age range. As a further example, the gender field 522 may be a single binary value representing either and/or female. The location field 524 may include a series of ASCII encoded numbers indicating a zip code. As will be recognize by those skilled in the art, any method and system of formatting field data to specify categories and subcategories of content may be used. Preferably the tag and field format is substantially standardized among media content providers, service providers, and server and client device manufacturers.

In one embodiment, providers of content to the server device 302 tag the content before making it available to the server 302. The content providers may fill in the fields, such as type, title, age, gender, income, location, and family, with the category data that the provider believes most accurately describes the type of content as it relates to users. In another embodiment, the server device 302 appends the tags to the content. In this embodiment the server device 302 is operable to determine what identifying information is most appropriate to the content and fill in each of the fields accordingly. The server device 302 has a dictionary of categories (e.g., type, title, age, gender, etc.) to select from. The tags that the client device 304 uses in the user profile 322 have categories (e.g., type, title, age, gender, etc.) selected from a common set of categories. Thus, the client device 304 and the server device 302 utilize a common tag format having common categories.

Over time, field categories and corresponding category options may change. For example, another identifier, such as "Education Level", may be added to the tag format. When the tag format changes, the switch to the new tag format at the server device 302 is preferably synchronized with the switch to the new tag format at the client device 304. FIG. 5 illustrates exemplary categories in an exemplary format, and it is to be understood that any field designations may be used that effectively describe the categories or classifications of content that may be distributed to users. In another embodiment, subcategories are used in addition to categories to describe content in more detail.

It is envisioned, for example, that the "type" field may have "subtypes." This may occur when the type is "movie." A "movie" subtype may further classify movies into genres such as, but not limited to, westerns, comedy, horror, drama, action, adult, etc. Another example of subtyping is a "sports" subtype." Subtypes of sports may be football, basketball, baseball, hockey, etc. As another example, the "family" category may have subcategories of "single," "married," "married with kids," "single parent," and others.

Thus, subcategorizing further describes content based on narrower classifications. The user profile 322 may be automatically or manually updated to track a user's selections of categories and/or subcategories to be blocked. Additionally, as is discussed in more detail below, tags may include a weight value associated with each field category or subcategory, indicating the relative importance of that category or subcategory.

FIG. 6 illustrates another exemplary portion of tagged advertisement content 600 that may be used in an embodiment of the present invention. Three advertisements 608, 612, and 615 are shown with associated tags 606, 610, and 614, respectively. Advertisement 608 is identified by its associated tag 606 to be an advertisement for Clinique® products and is directed to females of a middle range income and from ages 21-50. Advertisement 612 is identified by its associated tag 610 as being an advertisement for Budweiser® products and is directed to males of from ages 21-55, of any income, location, or family arrangement. The advertisement 615 is identified by its associated tag 614 as being an advertisement for Blue's Clues® program for children ages 2-7, and a family arrangement with kids.

Figure 7:
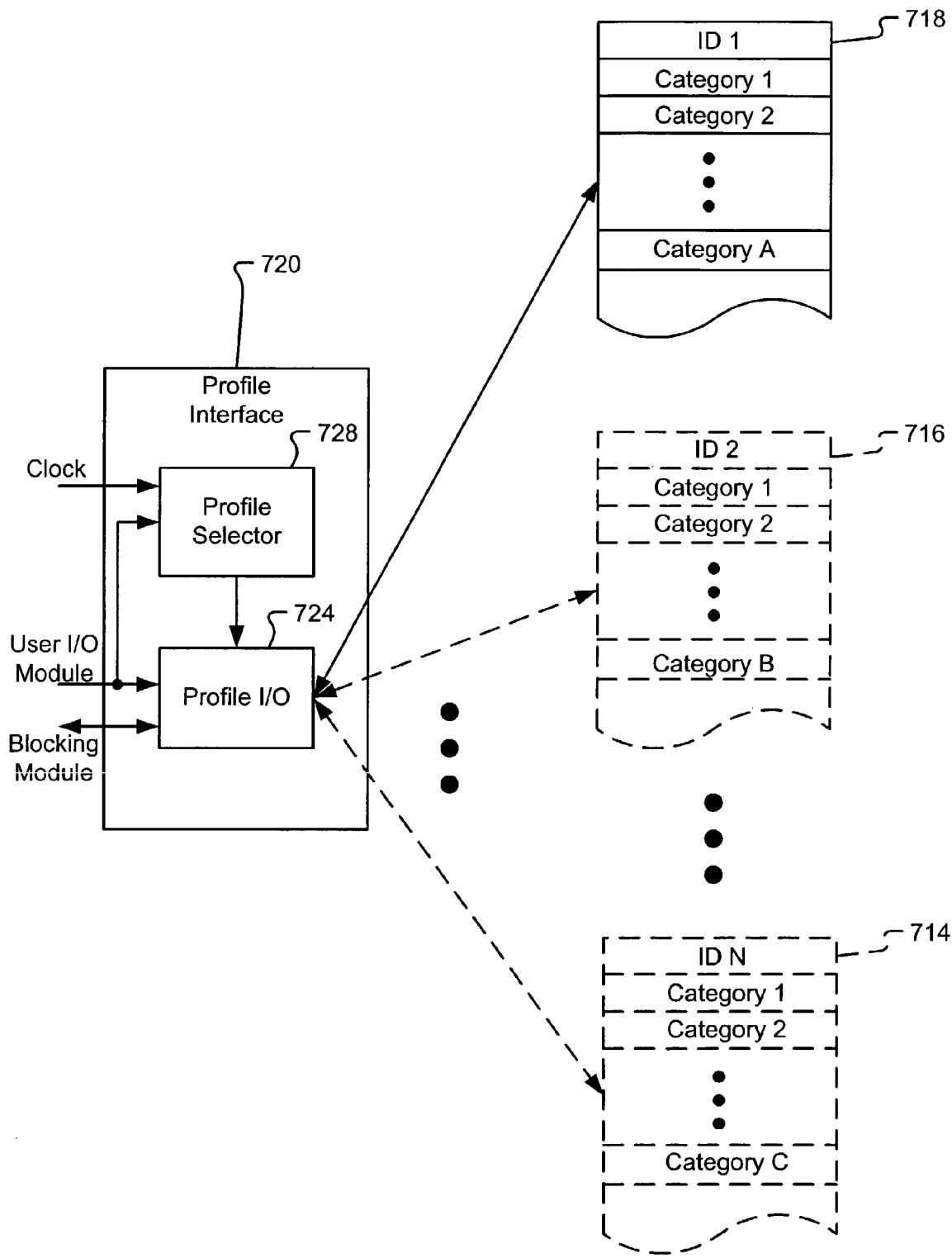
FIG. 7 illustrates a user profile interface interacting with one or more user profiles in an embodiment of the present invention

A user profile interface 720 is illustrated in FIG. 7 interacting with one or more user profiles 714, 716, and 718. Each of the user profiles 714, 716, and 718 is selectable by the profile interface 720. In one embodiment, the user profile interface 720 responsively selects one of the user profiles based upon the occurrence of events. The user profile interface 720 reads and writes user profile data from and to the selected user profile 718. Each of the user profiles 714, 716, and 718 are identified by unique identifiers, such as Identifier 1 (ID 1) in user profile 718. User profiles 714, 716, and 718 have category data, such as category one through category A in user profile 718, similar to category data in the tag fields shown in FIGS. 5 and 6, where "A" is an integer variable indicating any number of potential category designations. The category data in the user profiles 714, 716, and 718 represent categories and/or subcategories of media content that are to be blocked from presentation.

In one embodiment, the profile interface 720 has a profile input/output (I/O) module 724 that handles input and output to the user profiles. As illustrated, the profile I/O module 724 is accessing user profile 718. The profile I/O module 724 receives user input from the user I/O module 318 (FIG. 3), and in response, formats the data and/or encodes the data, as necessary, and writes the data to the user profile 718. The profile I/O module 724 responds to requests from the blocking module 404 (FIG. 4) by reading data out of the selected user profile 718 and transmitting it to the blocking module 404.

The profile interface 720 in one embodiment includes a profile selector 728 that responsively selects one of the user profiles 714, 716, or 718, depending on input from one or more sources. In one embodiment, the profile selector 728 receives user profile selection input from the user I/O module 318 that identifies one of the user profiles. The data received from the user I/O 318 may be a password, a pin number, or some other unique identifying information that enables the user to select one of the user profiles. The profile selector 728 transmits a selection message to the profile I/O module 724, notifying the profile I/O module 724 to utilize the selected user profile. The message sent to the profile I/O module 724 may be in any form including but not limited to, a base address, a pointer, an array index, or an offset in memory.

In another embodiment, the profile selector 728 receives input from a clock indicating the current time. A user in this embodiment is able to have one of the user profiles selected based upon a time of day. Thus, for example, the user transmits a message via the user I/O module 318, to the profile selector 728 indicating that user profile 718 should be selected from 6:00 AM to 10:00 PM, and after 10:00 PM, the user profile 716 should be selected. The profile selector 728 receives time selection data from the user I/O module 318, saves the time selection data, and refers to the time selection data during operation to determine when and if a user profile should be selected at a given time. The profile selector 728 compares the clock time to any time selection data that has been entered to determine if a user profile should be selected at the current time.

In embodiments described herein, the logical operations of the client device 304 and the server device 302 may be implemented as a sequence of computer implemented steps or program modules running on a microprocessor, such as, without limitation, a processor in a personal computer or a computer workstation. It will be understood to those skilled in the art that the client device 304 and the server device 302 of the present invention may also be implemented as interconnected machine logic circuits or circuit modules within a computing system. The implementation is a matter of choice dependent on the performance requirements of the computing system implementing the client device 304 and the server device 302.

The operation, structural devices, acts, and/or modules described herein may be implemented in software, in firmware, in special purpose digital logic, and/or any combination thereof without deviating from the spirit and scope of the present invention as recited within the claims attached hereto. Furthermore, the various software routines or software modules described herein may be implemented by any means known in the art. For example, any number of computer programming languages, such as "C", "C++", Pascal, FORTRAN, assembly language, Java, etc., may be used. By way of further example, and not limitation, any scripting language known in the art may be used, such as Korn shell script. Furthermore, various programming approaches such as procedural, object oriented or artificial intelligence techniques may be employed.

The client device 304 and the server device 302 may be implemented as software modules executed by one or more general purpose computers, such as the general purpose computer 200 illustrated in FIG. 2. As described in greater detail below, the client device 304 may be employed to receive, store, block, and/or present media content, such as movies, games, and/or advertisements. The client device 304 employs computer-readable media for carrying out the various tasks associated with blocking unwanted content from presentation to the user of the client device 304.

Figure 8:
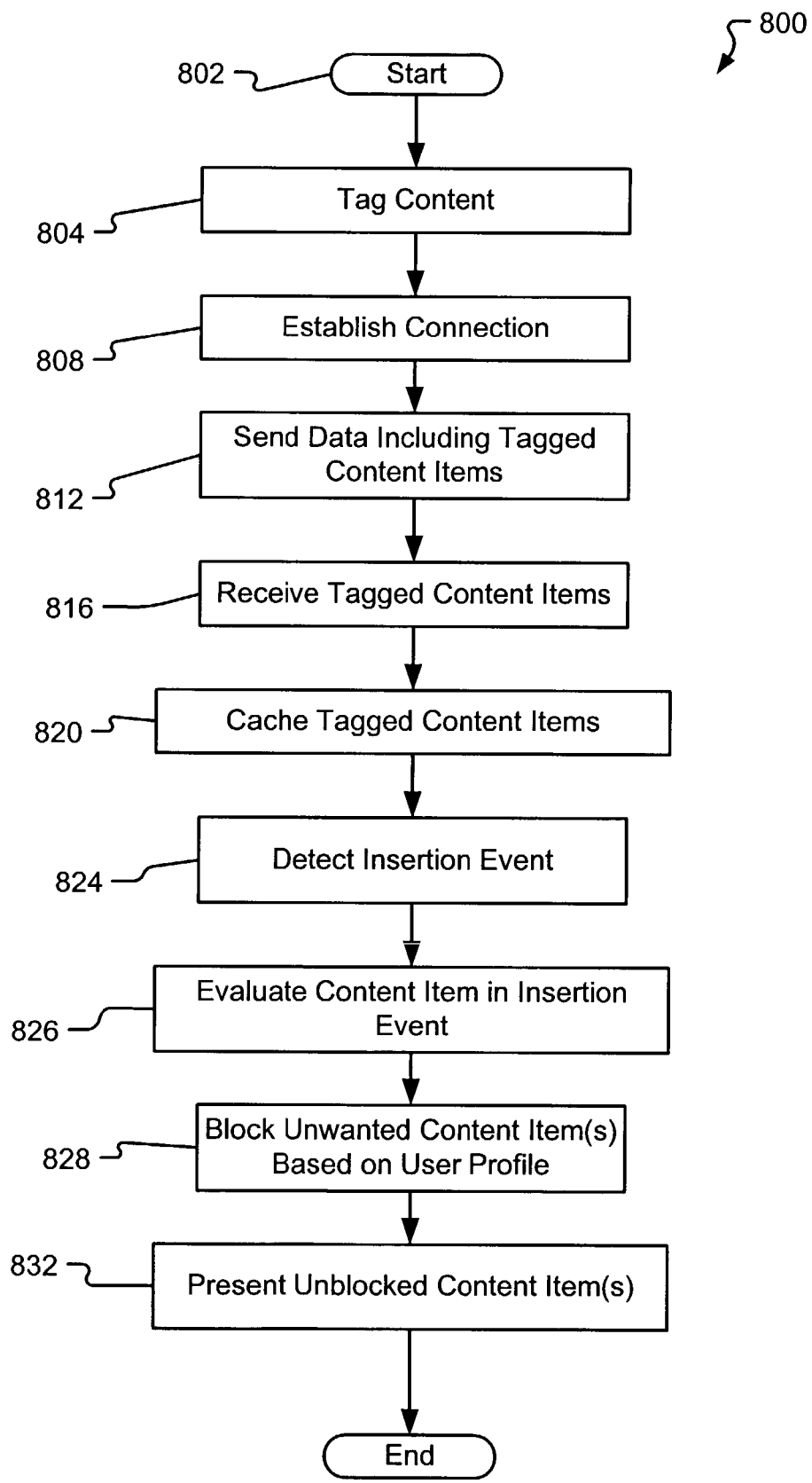
FIG. 8 is a flow diagram illustrating operations carried out in a tagged content distribution system in accordance with an embodiment of the present invention.

An operation flow chart 800 is shown in FIG. 8 illustrating operations performed in a tagged content distribution network in accordance with an embodiment of the present invention. After a start operation 802, a tag operation 804 tags content items that will be transmitted to a client device such as the client device 304. The server device 302 may perform the tag operation 804. Alternatively, an advertiser that provides content to the server device 302 may perform the tag operation 302. The tag operation 804 involves creating a tag describing relevant content categories and associating the tag with one or more content items. As discussed with respect to FIG. 5, in one embodiment, a tag includes field information designating various categories, and/or subcategories.

The tag operation 804 may involve assigning weighting values to tag fields, which indicate a relative importance of each field category. Thus, for example, in the tag operation 804, a tag for a beer advertisement may include age identification information of 21-55, with a relative weight of 1, and an income identification range of $30,000-$100,000, with a relative weight of 0.5. In this example, the tag indicates that the income range identified is less important than the age range that is identified.

Once content is tagged, an establish operation 808 establishes a communication connection between a client device 304 and a server device 302. Establishing a communication connection may be carried out using any means known in the art. By way of example, and not limitation, in an Internet environment a client computer typically send a request (e.g., a Hypertext Transport Protocol request) to a server computer to request a particular web page identified by a Universal Resource Locator (URL). As a further example, a connection may be established in a cable television environment by a set-top-box switching to a channel or transport frequency. Many other methods of establishing a communication connection are known in the art and will fall within the scope of the establish operation 808.

The server device 302 then sends data to the client device 304 in a sending operation 812. The data includes one or more of the tagged content items that were tagged in the tagging operation 804. The server may send content items using any transmission protocol known in the art, including proprietary or non-proprietary protocols. Sending the tagged content may include encoding the tagged content items, packetizing and/or formatting the encoded tagged content items, and modulating a carrier frequency with the packetized data. In the sending operation 812, the server may also append a unique client device identifier to the tagged content data such that a particular client device 304 is associated with the tagged content items. In a computer Internet environment, the client computer typically has a unique Internet Protocol (IP) address. In a cable television environment, each STB has a unique identifier. In general, each client device 304 may be uniquely identified on the network so that the server device 302 may send tagged content items directly to each client device in the sending operation 812.

As discussed above, the tagged content items that are sent in the send operation 812 may be any content, including advertising. The server device 302 may send the content items in any order applicable to the implementation. For example, in one implementation it may be most efficient for the server device 302 to send all advertisements in a group, sequentially, or not, and then all video content items, followed by all book content items, and so on.

In a receive operation 816, the client device 304 receives the tagged content items that were sent in the send operation 812. In the receive operation 816, the client device 304 detects tagged content items that are directed at the client device 304. The client device 304 then demodulates, decodes and formats tagged content items as necessary. Depending on the particular implementation, the receive operation 816 may involve synchronizing a data signal from the server device 302. In the receiving operation 816, the received tag(s) may be analyzed with reference to a user profile, such as the user profile 322, which may include tag identification information relating to unwanted content categories.

The client device 304 may cache tagged content items in a cache operation 820. In the cache operation 820, tagged content items are stored in memory (e.g., 204, 208, 210, etc.) that is accessible by the client device 304 for possible later presentation to the user. The tagged content items may be logically stored in memory in any arrangement. For instance, the cache operation 820 may involve logically storing the tagged content items contiguously in memory as they are received. Alternatively, the cache operation 820 may logically group certain types of content (e.g., video content) together in memory. However the content items are arranged logically in memory, it is to be understood that the physical locations in the memory need not follow the logical arrangement.

During operation, an insertion event may be detected in a detect operation 824. An insertion event is an indication to insert one or more content items into a stream of content items being presented to the user 824. The manner in which the content item is presented to the user is generally related either spatially (e.g., on a display monitor) or temporally (e.g., synchronized in time) to other content items that are presented to the user of the client device 304. In the detect operation 814, in a STB/TV or a TV-equipped computer environment, the client device 304 may receive, for example, a cue tone from the head-end, which indicates that an advertisement is to be displayed at a designated time. Also in the STB/TV environment, the client device 304 may receive input from the user to display a menu of content items (e.g., games). In this case, the input from the user is an indication to insert one or more content items (e.g., game content items) in a menu to the user.

After the client device 304 detects an indication to insert content, the client device 304 evaluates the content to be inserted in an evaluate operation 826. In the evaluate operation 826, the tags associated with the insertion event are evaluated based on a user profile (e.g., user profile 322), to determine whether the content associated with the insertion event should be blocked from presentation to the user. Any method of evaluation may be employed in the evaluate operation 826 to block one or more inappropriate content items. A block operation 828 blocks unwanted content items based on results of the evaluation operation 826.

In one embodiment, if a content item is determined to be inappropriate in the evaluate operation 826, the block operation 828 causes a default content item to be presented. An exemplary method of evaluation is discussed in detail below in reference to FIGS. 12-14. In a present operation 832, the client device 304 presents to the user content items that are not identified in the user profile 322 to be blocked.

Figure 9:
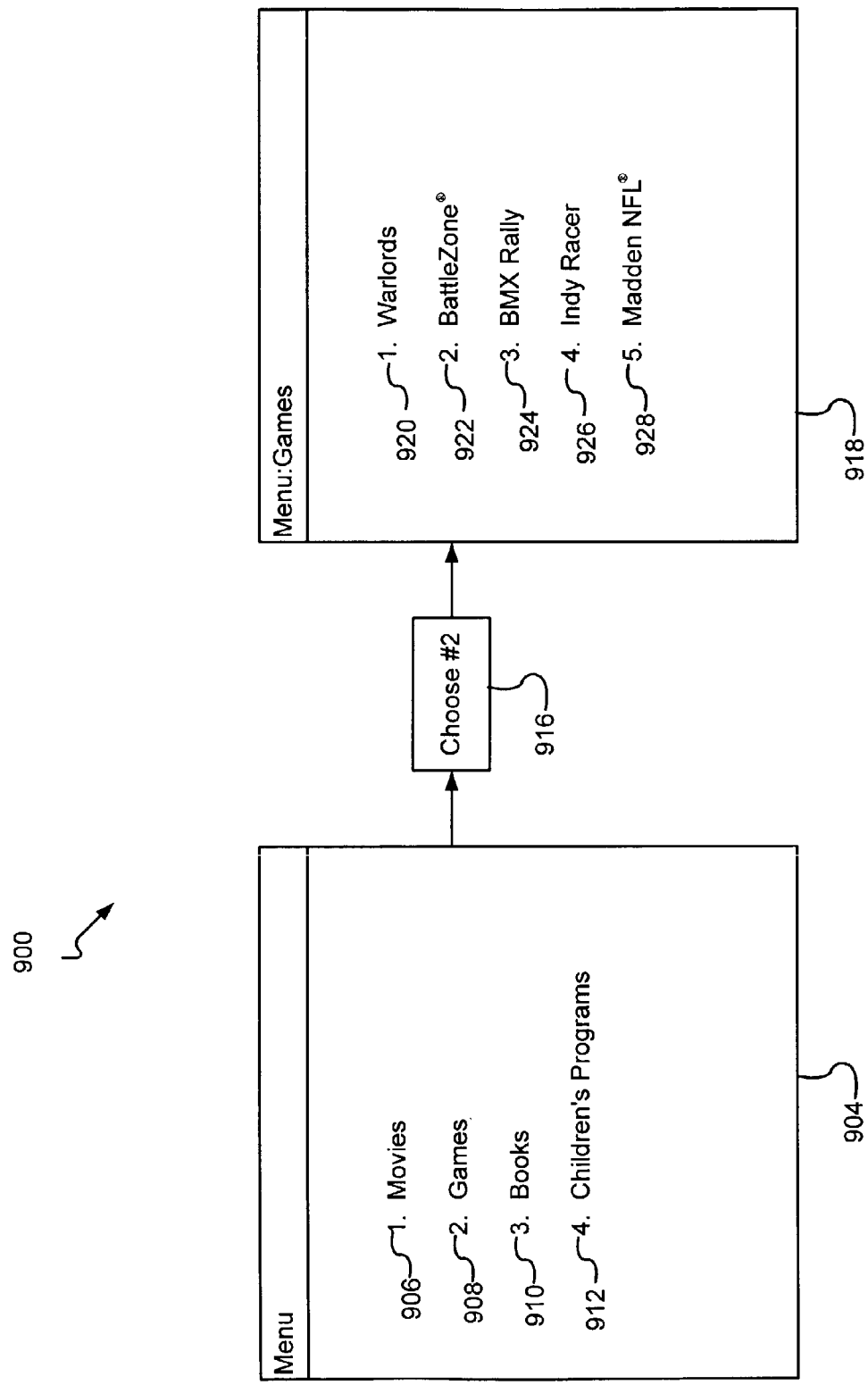
FIGS. 9 and 10 illustrate exemplary user interfaces that may be presented to a user of a client device in an embodiment of the present invention.

FIG. 9 illustrates an exemplary content selection user interface 900 that may be presented to a user of a client device 304 (FIG. 3) employing an embodiment of the present invention. The user interface 900 includes two menus presented to the user allowing the user to make selections. A content type menu 904 presents the user with four types of content from which to choose: movie content 906, games content 908, books content 910, and children's programming content 912. Using an input device, such as a mouse, keyboard, remote control, or the like, the user may select any of the items listed in the content type menu 904 to obtain a list of content items of the selected content type. As illustrated, the user may choose 916 the games content 908 type. When the user chooses 916 the games content 908, a games menu 918 is displayed with a list of five available and appropriate games: "Warlords"920, "BattleZone®" 922, "BMX Rally" 924, "Indy Racer"926, and "Madden NFL®" 928. The user may then select one of the games listed on the games menu 918 to get more information about a particular game. Most relevant to the present invention is the process that occurs when the user chooses, at choose operation 916, a particular item, such as the games content item 908.

When the user chooses an item, such as the games content item 908, a content insertion event arises from the user I/O module 318 (FIG. 3). The user I/O module 318 sends a message to the content insertion module 402 (FIG. 4) indicating that a list of appropriate items, e.g., games, is to be presented to the user. Additionally, the list of items may be sorted in order of user preference. In one embodiment, the content insertion engine 402 responds by retrieving tags from the client tag data 316 and sending the tags to the blocking module 404. The blocking module 404 blocks items having tags that are identified in the user profile 322. Consequently, in the example shown in FIG. 9, games having tags that are not identified in the user profile are transmitted to the presentation module 403. Meanwhile, games having tags that are identified in the user profile 322 are not sent to the presentation module 403. Consequently, the resulting list of games 918 only has games that satisfy predetermined requirements, i.e., the tags for the listed games are not identified as "blocked."

The presentation module 403 receives data, such as tags and/or content, and formats the data to be sent to the user I/O module 318. Using a list of games as an example, the presentation module 403 may wait to receive a number of tags before transmitting the game titles to the user I/O module 318. The user I/O module 318 will then present a list of game titles as shown in the games menu 918. Games that are blocked are not presented on the games menu 918.

Figure 10:
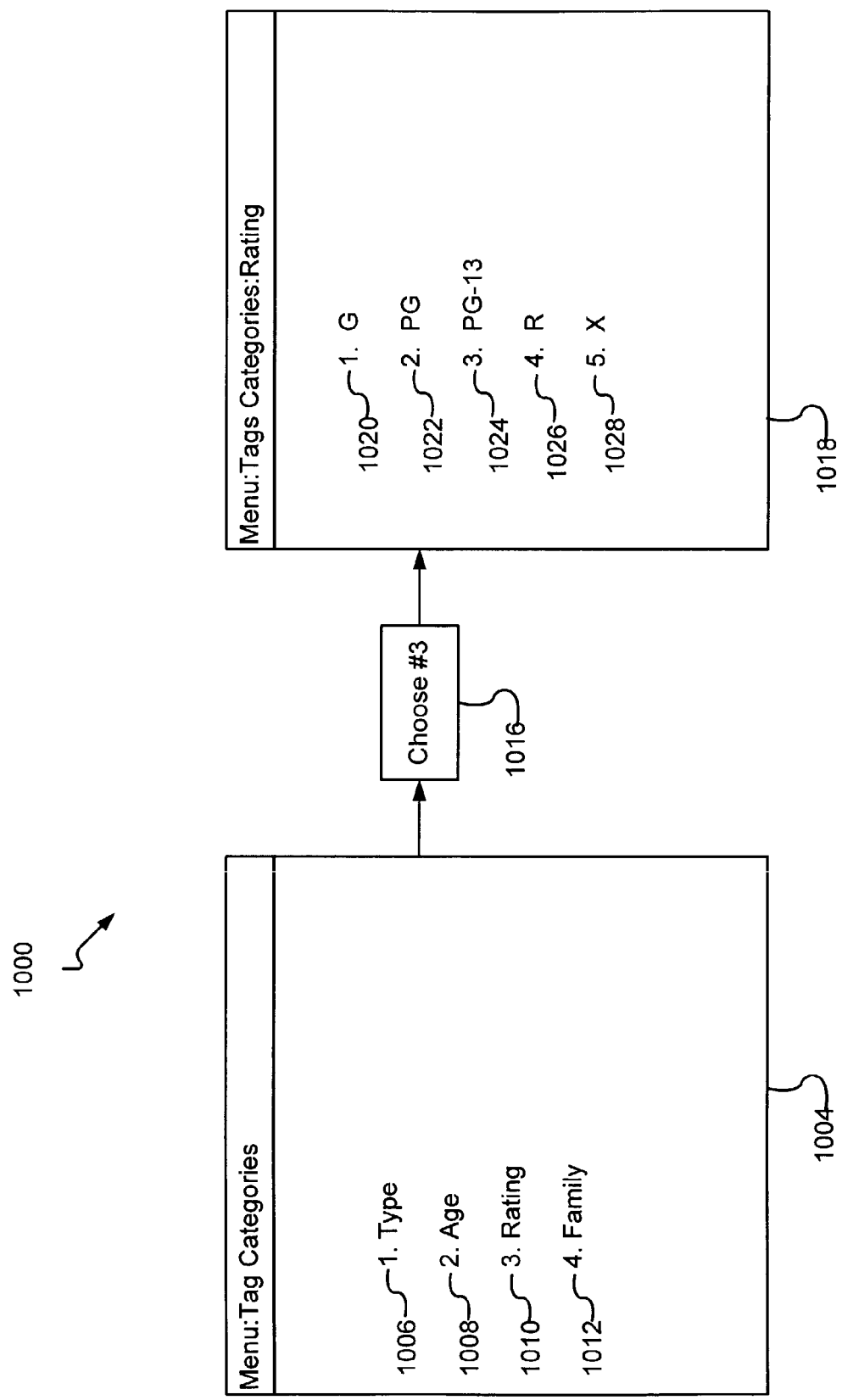
Figure 11:
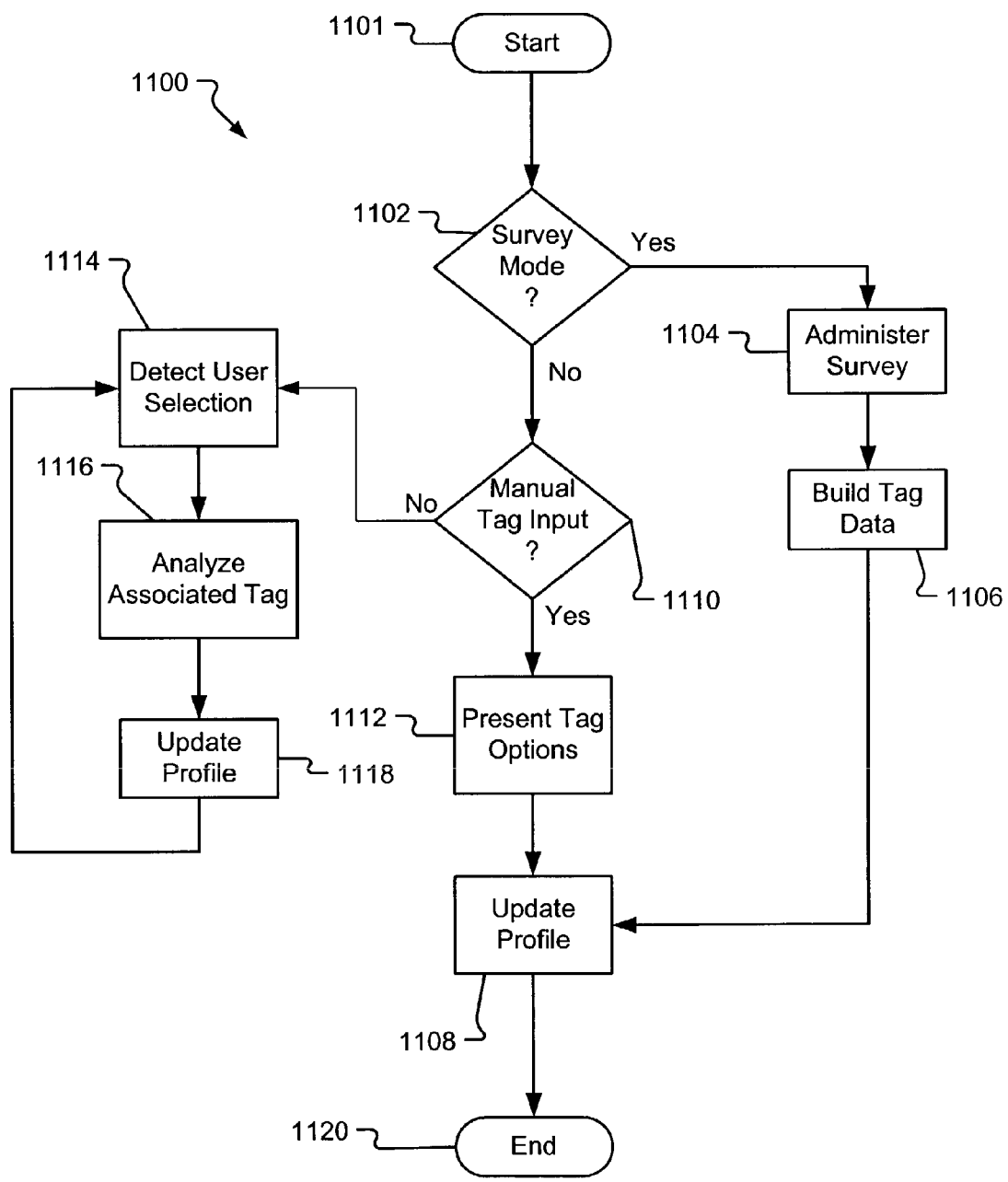
FIG. 11 is a flow diagram illustrating exemplary operations that may be employed by a profile generator for maintaining a user profile, such as the profile shown in FIG. 4.

As may be appreciated, prior to blocking content in response to insertion events, a user profile 322 (FIG. 3) is established. FIGS. 10 and 11 illustrate an exemplary process for establishing the user profile 322. The user profile 322 is based on tags that are used by content providers to categorize types of content. In one embodiment, the client device 304 presents a list of tags to the user with descriptions of the associated content. The user may thereby manually construct a user profile by entering tags that relate to content that is to be blocked. In another embodiment, the user profile 322 may be automatically updated by the client device 304 based on a user's viewing history.

FIG. 10 illustrates an exemplary category selection user interface 1000 that may be presented to enable a user of a client device 304 (FIG. 3) to manually enter categories and subcategories of content to be blocked. The user interface 1000 includes two menus presented to the user allowing the user to make selections. A tag categories menu 1004 presents the user with four categories of content from which to choose: type 1006, age 1008, rating 1010, and family 1012. Using an input device, such as a mouse, keyboard, remote control, or the like, the user may select any of the items listed in the tag categories menu 1004 to obtain a list of options associated with the selected category. As illustrated, the user may choose 1016 the rating 1008 category. When the user chooses 1016 the rating category 1008, a ratings menu 1018 is displayed with a list of five possible ratings: "G" 1020, "PG" 1022, "PG-13" 1024, "R" 1026, and "X" 1028. The user may then select one of the options listed on the ratings menu 1018 to have that selected rating added to the user profile 322.

FIG. 11 is an operation flow 1100 illustrating exemplary steps or operations that may be employed by the profile generator 406 for generating and/or updating a user profile (e.g., 322 in FIG. 3). In an embodiment, the user, upon initial power-up may be prompted to fill out a survey to provide information about the user to the client device 304. Query operation 1102 determines whether a survey mode has been entered. The survey mode may be entered any number of ways, including a determination that a survey has not yet been filled out, or that the user manually selected an option to enter the survey mode. If it is determined in the querying operation 1102 that the survey mode has been entered, operation flow 1100 branches YES to administer operation 1104. The administer operation 1104 administers a survey to the user. During the administer operation 1104, the user may enter demographic or other data that correspond to preferences for content.

In an embodiment, the data entered by the user in the survey is not released from the client device 304. Rather, the client device 304 uses the survey data to maintain the user profile 322 to provide future content to the user. Using the demographic data entered during the administer operation 1104, a build operation 1106 generates tags corresponding to the user's selections in the administer operation 1104. In one particular embodiment, the build operation 1106 identifies content categories that would typically be considered inappropriate for a user associated with the survey information. The inappropriate content categories may be based on statistical studies that relate demographic information to content categories. The build operation 1106 then creates fields similar to the fields illustrated in FIG. 5. As discussed above, a tag has category information in one or more fields in the tag. The category information generated in the build operation 1106 associates the user's survey data with categories of common identifiers discussed in FIG. 5. An update operation 1108, updates the profile 322 with tags that were generated in the build operation 1106.

If it is determined that the survey mode has not been entered in the query operation 1102, operation flow 1100 branches NO to query operation 1110, which determines whether a manual tag input mode has been entered. Query operation 1110 determines whether the user has selected an option for manually entering specific tags associated with media content that the user prefers (or does not prefer) to be presented. If query operation 1110 determines that a manual tag input mode has been entered, flow branches YES to present operation 1112 which presents tag options to the user that the user may select.

In one embodiment, the present operation 1112 displays a menu of tags and/or tag categories that have been programmed into the client device 304. The present operation 1112 may present content that has been previously compiled based on tags received from the server device 302, or the present operation 1112 may access a directory of tags that is periodically updated in the client device 304. After the present operation 1112 presents tag options to the user and the user selects one or more tag(s) related to content to be blocked, the update operation 1108 updates the user profile 322 with the tags selected by the user in the present operation 1112.

If the query operation 1110 determines that the manual tag input mode has not been entered, operation flow 1100 branches NO to detect operation 1114, which begins to detect user selections. The detect operation 1114 may detect any selections, such as, but not limited to, mouse clicks, keyboard entry, or remote control data entry. The detect operation 1114 may record the user selections along with other related information such as time of entry, or duration of viewing particular content. For example, in a set-top box implementation, the detect operation 1114 may detect a user selecting a Home Box Office® (HBO®) movie, such as "Band of Brothers"®. The detect operation 1114 records when the user begins watching "Band of Brothers"® as well as when the user changes the channel to another channel, such as a football game on CBS®. The collection, over time, of viewing patterns and preferences may be used to build a user profile, such as the user profile 322, indicating categories of media content that are not preferred. As discussed above, subcategories of undesired content may also be analyzed and stored in the user profile 322.

After the detect operation 1114 detects a user selection, an analyze operation 1116 stores tag data, such as category fields (e.g., 516, 518, etc., FIG. 5), associated with the user selection. As discussed, media content from the server device 302 includes a tag descriptive of the content based on predetermined content categories and subcategories. In the analyze operation 1116, the tag data may be stored for analysis, such as determining a pattern in the user's selections. In one embodiment, the analyze operation 1116 counts the categories and subcategories of content that the user views over time. If the count of a particular category or subcategory does not reach a predetermined threshold count, the category may be added to the user profile 322 in an update operation 1118.

The update operation 1118 updates the user profile 322 with tag data related to content that is automatically determined to be unwanted. After the user profile 322 is updated in the update operation 1118, operation flow 1100 loops back to the detect operation 1114 wherein subsequent user selections are detected. The detect operation 1114, the analyze operation 1116, and the update operation 1118 may be iterated indefinitely until the user turns off the client device 304.

Figure 12:
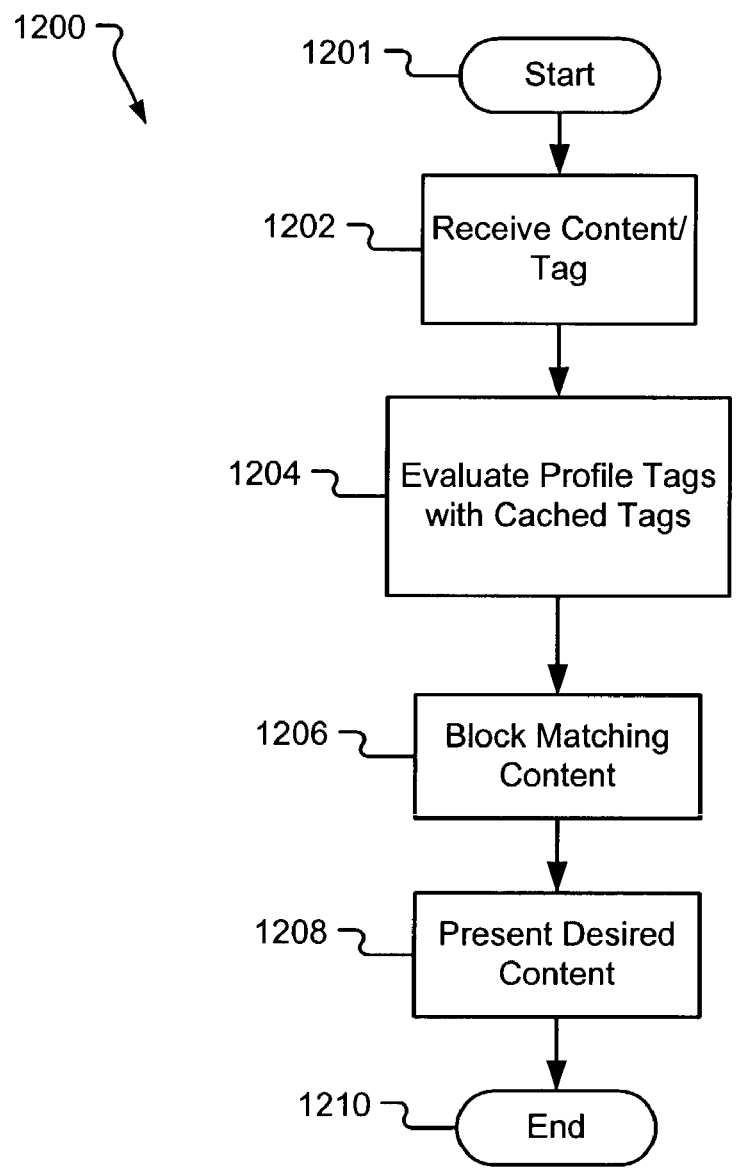
FIG. 12 is a flow diagram illustrating exemplary operations that may be implemented by a blocking module, such as the blocking module shown in FIG. 4.

FIG. 12 is an operation flow 1200 including exemplary steps or operations that may be implemented by the block module 404 (FIG. 4) to block out media content received from the server device 302 that is less preferred by the user. A receive operation 1202 receives a command to insert media content from the content insertion engine 402. An evaluate operation 1204 then evaluates the received tags based on tags in the user profile 322 to determine whether tagged data from the content insertion module 402 should be blocked. In the evaluate operation 1204 it is determined whether tag category data from the content insertion module 402 match tag category data in the user profile 322. In one embodiment, the evaluate operation 1204 compares each field in a tag from the user profile with each field in a tag from the content insertion engine 402. In one embodiment, if a field in both tags matches, the associated content is not presented to the user.

A block operation 1206 then blocks the media content having tag data that matches tag data in the user profile 322. In the block operation 1206, content that is determined to match corresponding tag data in the user profile is not presented to the user of the client device. Thus, the blocking module 404 (FIG. 4) does not transmit matching content to the presentation module 403. In a present operation 1208, the user I/O module 318 presents media content that is not screened in the block operation 1206. The present operation 1208 presents alternative content other than the blocked content. The operation flow ends at end operation 1210.

Figure 13:
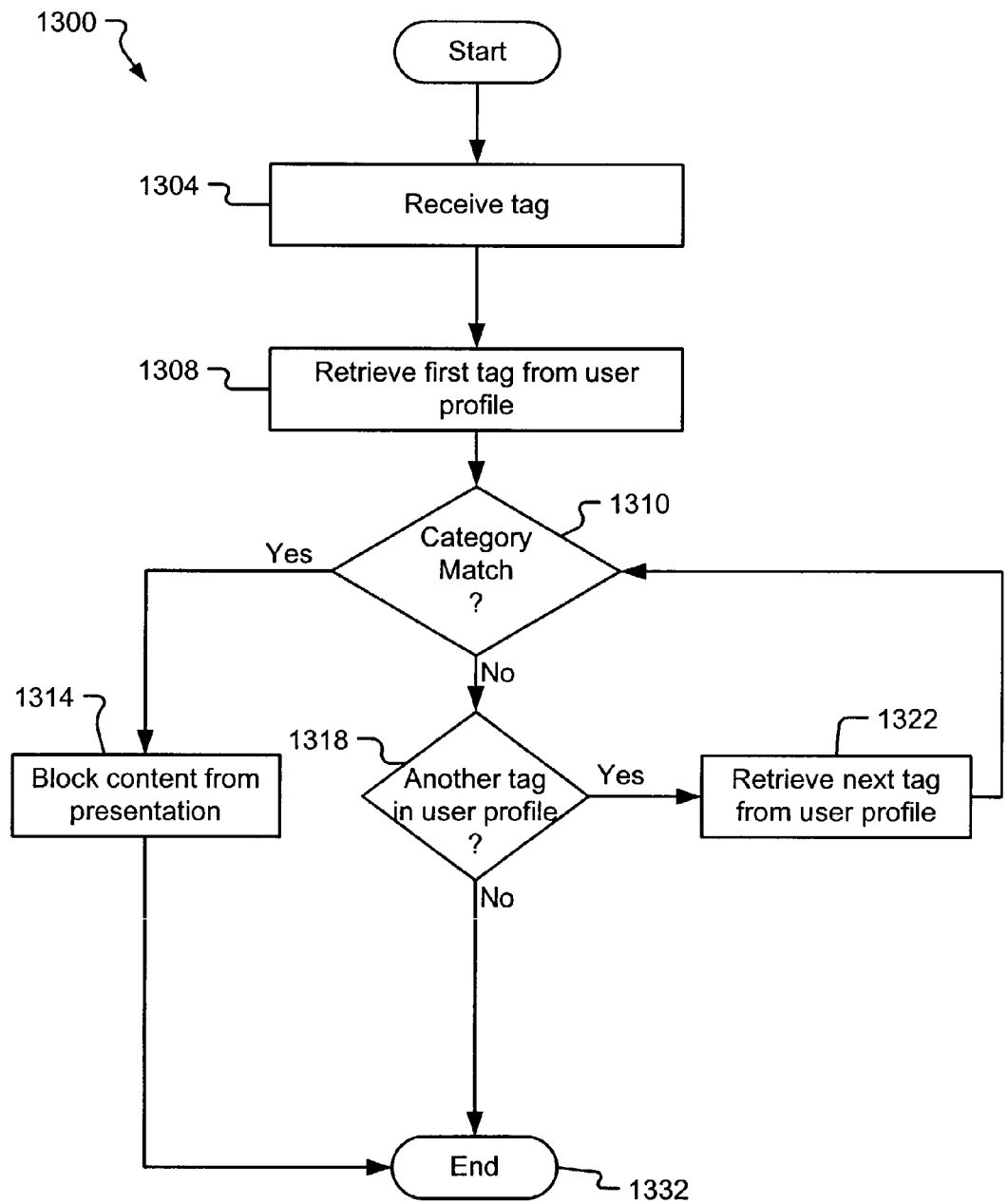
FIG. 13 is a flow diagram illustrating exemplary operations of a particular embodiment of a blocking operation, such as the blocking operation shown in FIG. 12.

FIG. 13 illustrates an embodiment of an evaluate operation, such as the evaluate operation 1204 (FIG. 12). In a receive operation 1304, the block module 404 receives a tag and content from the content insertion module 402. In this particular embodiment, the content insertion module 402 receives a tag and content from the receive module 312 and keeps track of the order of dispensing tags to the blocking module 404. The blocking module 404 retrieves a tag out of the user profile 322 in a retrieve operation 1308.

In a compare operation 1310, the blocking module 404 compares the tag from the receive module 312 to the tag from the user profile 322 to determine if the two tags have any matching categories. Comparing the two tags may be accomplished using any method known in the art and depends on how the tags are encoded in the particular implementation. For example, fields in the tags may be encoded as single bits (either on or off). In this example, the compare operation 1310 may perform a bit-mask operation, which is a computationally efficient way of comparing bits.

If it is determined that the two tags retrieved in operations 1304 and 1308 have matching category data, the blocking module 404 blocks the content received from the content insertion module 402 in a block operation 1314. In the block operation 1314, the blocking module may transmit alternative content to the presentation module 403. However, if the two tags compared in the comparing operation 1310 do not match in any category, the blocking module 404 determines whether any more tags exist in the user profile 322. In a determine operation 1318, the blocking module 404 reads the user profile 322 to determine if another tag is available for comparison. If so, the blocking module 404 retrieves the next tag from the user profile 322 in a retrieve operation 1322. After the next tag is retrieved from the user profile 322, the compare operation 1310 compares the next user profile tag with the tag received from the content insertion module 402. If, on the other hand, the determine operation 1318 determines that no other tags remain to be compared in the user profile 322, flow branches NO to 1326 an ending operation 1332.

Figure 14:
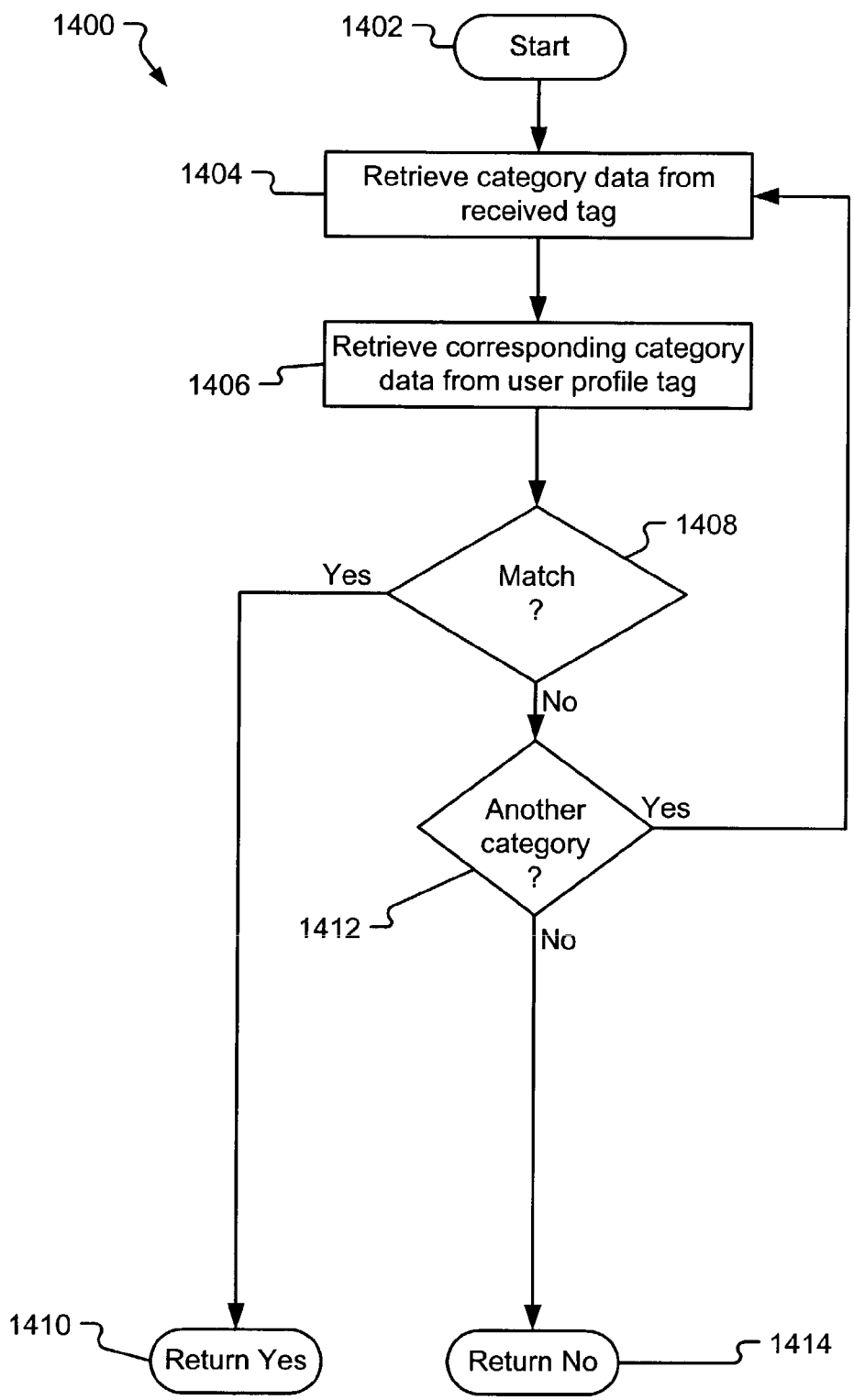
FIG. 14 is a flow diagram illustrating an exemplary process of comparing tags in accordance with an embodiment of the present invention.

FIG. 14 is an operation flow 1400 illustrating exemplary operations that may be employed in an embodiment of the compare operation 1310 of FIG. 13. Input to the operation is a tag from the content insertion module 402 and a tag from the user profile 322. In general, the operational flow 1400 iterates through fields in the tag from the content insertion module 402 and corresponding fields in the tag from the user profile 322, determining if any category data for the tags matches. If any categories match, a "YES" value is returned. Otherwise, a "NO" value is returned.

After a start operation 1402, a retrieve operation 1404, retrieves a category (e.g., type category 516 of FIG. 5) and its field data (e.g., "Game") from the tag that is received from the content insertion module 402. In another retrieve operation 1406, corresponding type field data is retrieved from the user profile tag. In a compare operation 1408 it is determined whether the identifying data for the two associated fields matches. For example, if the type category data is "Game" in both the fields, the fields match. If the category data matches, operation flow 1400 branches "YES" to a return YES operation 1410 returns an indicator that at least one category matches in the two tags being compared. If, in the compare operation 1408, the field data of the content tag does not match that of the user profile tag, a determine operation 1412 determines if another field remains in the tags to be compared.

If the determine operation 1412 determines that another field (e.g., title field 518 of FIG. 5) remains for comparison, the retrieve operation 1404 retrieves the field and its category data from the received tag. Processing continues as before to compare the corresponding field data of the user profile tag. If no more fields remain to be processed in the determine operation 1412, a return NO operation 1414 returns an indicator that the tag from the content insertion module 402 does not match the user profile tag in any categories.

Figure 15:
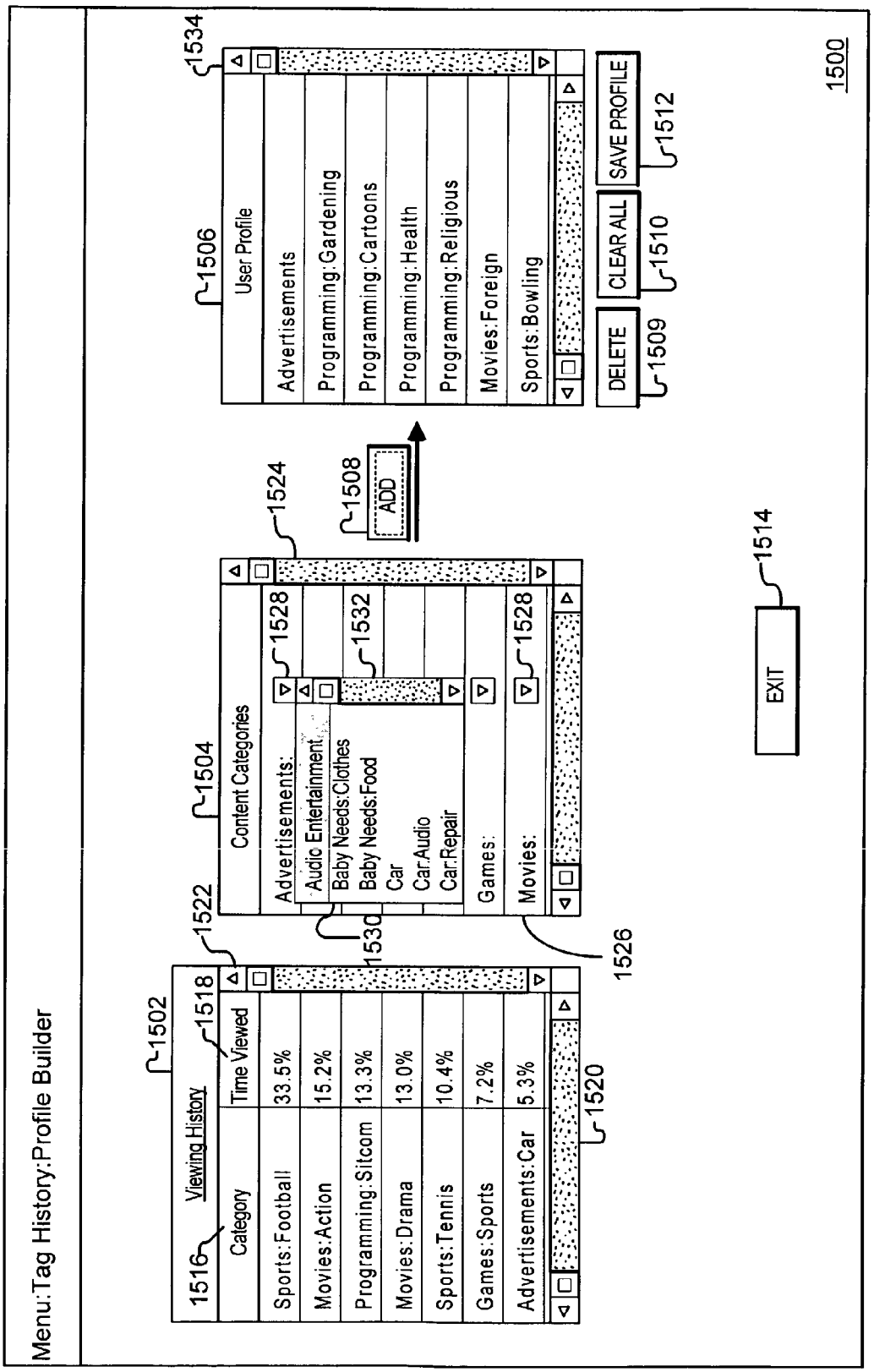
FIG. 15 illustrates a user interface that may be employed in an embodiment of the present invention to enable the user to edit a user profile in view of the user's viewing history.

In another embodiment illustrated in FIG. 15, the user is enabled to create a user profile in view of the user's viewing history. A user interface 1500 provides a viewing history pane 1502, a categories pane 1504, and a user profile pane 1506. Via the user interface 1500, the user may view data about the user's viewing history in the viewing history pane 1502. Based on the viewing history data, the user may select content categories from the content categories pane 1504 to be blocked. To add categories to the user profile pane 1506, the user selects an "add" visual display element, such as an add button 1508. In another embodiment, the categories in the viewing history pane 1502 are selectable (e.g., by using a mouse or similar input device), and when selected are added to the user profile pane 1506.

The user may delete a selected category from the user profile pane 1506 using a "delete" visual display element, such as the delete button 1509. The user may also clear all categories from the user profile pane 1506 with a "clear" visual display element, such as the clear all button 1510. In addition, the user may save the categories in the user profile pane 1506 to the user profile in memory using a save visual display element, such as the save profile button 1512. After the user has created the user profile, the interface 1500 may be exited with an exit button 1514.

In this particular embodiment, the viewing history pane 1502 has two columns of data, a category column 1516 and a time viewed column 1518. The category column 1516 includes categories and subcategories of media content the user has viewed. The time viewed column 1518 provides viewing time data corresponding to each of the categories or subcategories in the category column 1516. The viewing time data may indicate viewing time in absolute time units (e.g., time in hours) or the viewing time data may indicate a relative amount of time spent viewing each of the corresponding categories or subcategories. For example, as illustrated, the subcategory football has been watched 33.5% of the time according to the viewing history. The viewing history pane 1502 includes selecting elements, such as a horizontal scroll bar 1520 and a vertical scroll bar 1522, that enable the user to scroll through the categories and frequencies.

The viewing time values shown in the time-viewed column 1518 may be determined using any method as may be known in the art. In one embodiment of the client device 304 (FIG. 3), the analysis module 314 calculates the time-viewed values. In this embodiment the content insertion engine 402 (FIG. 4) of the analysis module 314 monitors the categories and subcategories of content that are viewed. The content insertion engine 402 may include a timer device that monitors how long each item of content is viewed.

Then, the content insertion engine 402 accumulates viewing time associated with each category and subcategory of content. On a substantially continuous basis, the content insertion engine 402 may calculate a time-viewed value for each category and subcategory. The time viewed value may be given on a percentage basis by dividing the total viewing time by the accumulated viewing time associated with each category and subcategory. The content insertion engine 402 saves the time-viewed values in memory. When the user views the interface 1500, each time-viewed value and associated category or subcategory is transmitted to the presentation module 403 via the blocking module 404, for presentation in the viewing history pane 1502.

The content categories pane 1504 is a list of all possible categories and subcategories from which the user may select. The user may scroll through all categories using a scroll bar 1524. When the user identifies a category to be added to the user profile, such as advertisements, the user may select the advertisements category and then select the add button 1508 to add the category advertisements to the user profile pane 1506. In another embodiment, using a mouse input device, the user may double click a category or subcategory, such as advertisements, to add that category or subcategory to the user profile pane 1506. Each row 1526 in the content categories pane 1504 includes a drop down selector 1528.

When the user selects the drop down selector 1528, a drop down menu 1530 is presented with a list of subcategories associated with a higher level category. The drop down menu 1530 includes vertical scroll bar 1532, whereby the user may scroll through the subcategories associated with the higher-level category. For example, under the higher level category 'advertisements,' a user may select the subcategory 'baby needs advertisements' for addition to the user profile pane 1506. As with higher-level categories, the user may add a subcategory to the user profile pane 1506 by selecting the subcategory and selecting the add button 1508, or by "double clicking" on the subcategory.

As content categories are selected by the user and added to the user profile pane 1506, they appear in a row in the user profile pane 1506. The user may view all of these content categories or subcategories using selective visual display elements, such as a vertical scroll bar 1534 and a horizontal scroll bar 1536. If the user wants to remove a category or subcategory from the user profile pane 1506, the user may select the content category or subcategory and activate a delete button 1509. When the delete button 1509 is activated, a selected category or subcategory in the user profile pane 1506 is removed from the user profile pane 1506. If the user wishes to remove all categories and subcategories from the user profile pane 1506, the user may select the clear all button 1510, which removes all categories or subcategories from the user profile pane 1506. When the user is satisfied with the categories or subcategories that are in the user profile pane 1506, the user may select the save profile button 1512 to save the categories and subcategories to the user profile. When the save profile button 1512 is selected, the content categories and subcategories identified in the user profile pane 1506 are encoded and/or formatted as necessary, and saved to a user profile in long-term memory to be used later for blocking undesired content. When the user is finished editing the user profile, the user may press an exit button 1514 to exit the profile builder interface 1500.

The method steps illustrated in FIGS. 8 and 11-14 may be implemented in firmware in a computer system. Additionally, the logical operations of the various embodiments of the present invention are implemented (1) as a sequence of computer implemented acts or program modules running on a computing system and/or (2) as interconnected machine logic circuits or circuit modules within the computing system.

The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

What is claimed is:

1. A method of modifying a user profile for evaluating media content in a distributed network, the distributed network having a client device and a server device, the method comprising: presenting, by a client device, a first prompt to a user for selection of a survey mode for establishing the user profile; if the survey mode is determined, then: causing presentation of a survey to the user, receiving demographic data that corresponds to a preference for content, identifying content categories that are inappropriate for the demographic data, and generating content tags that correspond to the demographic data; if the survey mode is not determined, then presenting a second prompt for manual construction of the user profile; if manual construction is selected, then: causing presentation of a user interface having a viewing history window pane, a categories window pane, and a user profile window pane, the viewing history window pane listing categories of content that have been previously viewed by the user and a viewing time associated with each category of content, the categories window pane listing category names and subcategory names from which the user may select to construct the user profile, and the user profile window pane list the category names and subcategory names that are currently associated with the user profile; and receiving the user's selection of the category names and the subcategory names to block from presentation; if manual construction is not selected, then detecting the user's viewing selection including a time of a selection and a duration of viewing of the selection to build, over time, categories of content that are not preferred; receiving tagged content comprising media content and at least one content tag with the content tag having a columnar arrangement comprising rows of data fields corresponding to a type of content in a first row, a title of the content in a lower second row, and an age range in a third row below the second row; organizing and storing the tagged content in memory according to a type of content, such that same types of content are grouped together in the memory; comparing the at least one content tag to the user profile; and when the at least one content tag is found in the user profile, then blocking the tagged content from presentation.

2. A method as defined in claim 1, further comprising enabling the user to select one or more tag categories for insertion into the user profile.

3. A method as defined in claim 2, wherein enabling the user comprises:
presenting a viewing history comprising a category of the content tag and viewing statistics describing the duration of viewing; and
presenting a plurality of tag categories that may be selected for insertion into the user profile.

4. A method as defined in claim 3, wherein the category is selectable for insertion into the user profile.

5. A method as defined in claim 1, further comprising:
presenting other tagged content;
monitoring viewing statistics describing the duration of viewing associated with the other tagged content; and
presenting the viewing statistics associated with the other tagged content.

6. A method as defined in claim 5, wherein monitoring the viewing statistics associated with the other tagged content comprises:
measuring a first viewing time value representing time spent viewing the other tagged content; and
measuring a second viewing time value representing time spent viewing the other tagged content; and
dividing the first and second viewing time values by a total viewing time to yield a viewing time percentage for each category of tagged content.

7. A method as defined in claim 6, wherein presenting the viewing statistics comprises:
causing presentation of the viewing time percentage for each category of tagged content in the viewing history window pane.

8. A method as defined in claim 7, further comprising causing presentation of:
a first column having one or more content categories or subcategories; and
a second column having one or more time values, each time value associated with the one or more content categories or subcategories.

9. A method as defined in claim 8, further comprising adding and deleting categories and subcategories from the user profile window pane for insertion and deletion from the user profile.

10. The method according to claim 1, wherein organizing and storing the tagged content further comprises grouping and storing together the content according to advertising content, movie content, and gaming content.

11. The method according to claim 1, wherein the content categories comprises a type field, a title field, an age field, a gender field, an income field, a location field, a family field, and a rating field.

12. A system for evaluating media content, the system comprising operative to:
a processor executing code stored in memory that causes the processor to:
present a first prompt to a user for selection of a survey mode for establishing the user profile;
if the survey mode is determined, then:
cause presentation of a survey to the user,
receive demographic data that corresponds to a preference for content,
identify content categories that are inappropriate for the demographic data, and
generate content tags that correspond to the demographic data;
if the survey mode is not determined, then present a second prompt for manual construction of the user profile;
if manual construction is selected, then:
cause presentation of a user interface having a viewing history window pane, a categories window pane, and a user profile window pane, the viewing history window pane listing categories of content that have been previously viewed by the user and a viewing time associated with each category of content, the categories window pane listing category names and subcategory names from which the user may select to construct the user profile, and the user profile window pane listing the category names and subcategory names that are currently associated with the user profile; and
receive the user's selection of the category names and the subcategory names to block from presentation;
if manual construction is not selected, then detect the user's viewing selections including a time of entry of a selection and a duration of viewing of the selection to build, over a time, categories of content that are not preferred;
receive tagged content comprising media content and at least one content tag;
receive the at least one content tag as a columnar arrangement comprising rows of data fields corresponding to a type of content in a first row, a title of the content in a lower second row, and an age range in a third row below the second row;
organize and store the tagged content in memory according to advertising content, movie content, and gaming content;
receive an internal insertion event occurring at a client device;
present a menu of types of media content in response to the internal insertion event;
receive a selection from the menu as another internal insertion event;
record the user's inputs from an input/output module;
analyze the recorded user's inputs to detect a usage pattern;
update the user profile with the detected usage pattern to include new tags and categories of content that should be blocked from presentation;
retrieve the tagged content from the memory;
compare the at least one content tag to the updated user profile; and
when the at least one content tag is found in the updated user profile, then block the tagged content from presentation.

13. The system according to claim 12, wherein the content categories comprises a type field, a title field, an age field, a gender field, an income field, a location field, a family field, and a rating field, with the age field comprising two binary encoded values representing a minimum age and a maximum age yielding an age range.

14. The system according to claim 13, further comprising means for associating a weight value with each content category, the weight value indicating a relative importance of each category.

15. The system according to claim 12, further comprising:
means for receiving an input from a clock that indicates a current time; and
means for selecting the user profile based on the current time.

16. The system according to claim 12, wherein when the tagged content is blocked from presentation, then further comprising means for presenting a default content item.

17. The system according to claim 12, further comprising means for grouping and storing together content according to advertising content, movie content, and gaming content.

18. A method comprising: presented, by a client device, a first prompt to a user for selection of a survey mode for establishing a user profile; if the survey mode is determined, then: causing presentation of a survey to the user, receiving demographic data that corresponds to a preference for content, identifying content categories that are inappropriate for the demographic data, and generating content tags that correspond to the demographic data; if the survey mode is not determined, then presenting a second prompt for manual construction of the user profile; if manual construction is selected, then: causing presentation of a user interface having a viewing history window pane, a categories window pane, and a user profile window pane, the viewing history window pane listing categories of content that have been previously viewed by the user and a viewing time associated with each category of content, the categories window pane listing category names and subcategory names from which the user may select to construct the user profile, and the user profile window pane listing the category names and subcategory names that are currently associated with the user profile; and receiving the user's selection of the category names and the subcategory names to block from presentation; if manual construction is not selected, then detecting the user's viewing selections including a time of entry of a content are not preferred; downloading a pre-created profile from a website when desired; as an educational level of the user changes, changing a tag format to correspond to the educational level of the user and synchronizing the changed tag format at the client device; receiving the at least one content tag as a columnar arrangement comprising rows of data fields corresponding to a type of content in a first row, a title of the content in a lower second row, and an age range in a third row below the second row; organizing and storing the tagged content in memory according to advertising content, movie content, and gaming content; receiving an internal insertion event occurring at the client device; presenting a menu of types of media content in response to the internal insertion event; receiving a selection from the menu as another internal insertion event; recording the user's inputs from an inputs/output module; analyzing the recorded user's inputs to detect a usage pattern; updating the user profile with the detected usage pattern to include new tags and categories of that should be blocked from presentation; retrieving the tagged content from the memory; comparing the at least one content tag to the update user profile; and when the at least one content tag is found in the updated user profile, then blocking the tagged content from presentation.

19. The method according to claim 18, wherein each content category comprises a type field, a title field, an age field, a gender field, an income field, a location field, a family field, and a rating field, with the age field comprising two binary encoded values representing a minimum age and a maximum age yielding an age range.

20. The method according to claim 19, further comprising associating a weight value with each content category, the weight value indicating a relative importance of each category.

21. The method according to claim 18, further comprising:
receiving an input from a clock that indicates a current time; and
selecting the user profile based on the current time.

22. The method according to claim 18, wherein when the tagged content is blocked from presentation, then further comprising presenting a default content item.

23. The method according to claim 18, further comprising receiving the at least one content tag comprising an age field having two binary encoded values representing a minimum age and a maximum age, a gender field having a single binary value representing at least one of male and female, and a series of numbers indicating a zone improvement plan.

* * * * *